US009380451B2

(12) United States Patent
Yamashita

(10) Patent No.: US 9,380,451 B2
(45) Date of Patent: Jun. 28, 2016

(54) INFORMATION PROCESSING SYSTEM AND INFORMATION PROCESSING METHOD

(71) Applicant: Nintendo Co., Ltd., Kyoto (JP)

(72) Inventor: Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/633,789

(22) Filed: Feb. 27, 2015

(65) Prior Publication Data

US 2015/0172911 A1 Jun. 18, 2015

Related U.S. Application Data

(63) Continuation of application No. 14/575,424, filed on Dec. 18, 2014, which is a continuation of application No. 13/253,337, filed on Oct. 5, 2011, now Pat. No. 8,948,065.

(30) Foreign Application Priority Data

Dec. 21, 2010 (JP) .................. 2010-284685

(51) Int. Cl.
*A63F 13/30* (2014.01)
*H04W 8/20* (2009.01)
(Continued)

(52) U.S. Cl.
CPC ............... *H04W 8/205* (2013.01); *A63F 13/12* (2013.01); *A63F 13/847* (2014.09); *A63F 13/87* (2014.09); *H04W 4/008* (2013.01); *H04W 4/023* (2013.01); *H04W 4/027* (2013.01); *H04W 8/005* (2013.01);
(Continued)

(58) Field of Classification Search
CPC ..... A63F 13/21; A63F 13/211; A63F 13/212; A63F 2300/1012
USPC .......................................... 463/36, 37, 39, 40
See application file for complete search history.

(56) References Cited

U.S. PATENT DOCUMENTS 6,426,719 B1 * 7/2002 Nagareda et al. ........ 342/357.52
7,782,297 B2 * 8/2010 Zalewski et al. .............. 345/156
(Continued)

FOREIGN PATENT DOCUMENTS

| JP | 2001-186074 | 7/2001 |
| JP | 2009-61547 | 3/2009 |
| JP | 2010-166437 | 7/2010 |

OTHER PUBLICATIONS

FCC Part 15.249 EMI Measurement and Test Report for Apple Computer Inc., FCC ID: BCGA1193, Model: A1193, Report No. R0604183, Bay Area Compliance Laboratory Corporation, May 10, 2006, 13 pages.

(Continued)

*Primary Examiner* — Allen Chan
(74) *Attorney, Agent, or Firm* — Nixon & Vanderhye, P.C.

(57) ABSTRACT

A handheld terminal 200 performs wireless communication with a game apparatus 103 and determines whether the wireless communication with the game apparatus 103 is possible. The game apparatus 103 performs wireless communication with the handheld terminal 200 and determines whether the wireless communication with the handheld terminal 200 is possible. The game apparatus 103 performs a return home determination process, based on the determination about whether the wireless communication is possible, when the wireless communication with the handheld terminal 200 has become, after having become disabled, enabled again.

28 Claims, 18 Drawing Sheets

(51) Int. Cl.

| | | |
|---|---|---|
| *A63F 13/847* | (2014.01) | |
| *A63F 13/87* | (2014.01) | |
| *H04W 8/00* | (2009.01) | |
| *H04W 4/00* | (2009.01) | |
| *H04W 4/02* | (2009.01) | |
| *H04W 76/02* | (2009.01) | |

(52) U.S. Cl.
CPC ........ *H04W 76/023* (2013.01); *A63F 2300/204* (2013.01); *A63F 2300/402* (2013.01); *A63F 2300/403* (2013.01); *H04W 76/02* (2013.01)

(56) References Cited

U.S. PATENT DOCUMENTS

| | | |
|---|---|---|
| 2004/0259546 A1 | 12/2004 | Balachandran et al. |
| 2004/0259642 A1 | 12/2004 | Tanaka et al. |
| 2005/0288012 A1 | 12/2005 | Morgan |
| 2007/0179749 A1* | 8/2007 | Landrieve .............. A63B 71/06 702/188 |
| 2008/0125288 A1* | 5/2008 | Case ....................... G06F 17/40 482/1 |
| 2009/0164172 A1* | 6/2009 | Hartmann et al. ............. 702/182 |
| 2009/0170607 A1 | 7/2009 | Chiao et al. |
| 2009/0171799 A1 | 7/2009 | Ying |
| 2010/0100012 A1* | 4/2010 | Matsumura et al. .......... 600/595 |
| 2010/0150073 A1 | 6/2010 | Sasao |
| 2010/0184379 A1 | 7/2010 | Shimomura |
| 2010/0249494 A1* | 9/2010 | Yoshizawa et al. ............. 600/27 |
| 2010/0298976 A1 | 11/2010 | Sugihara et al. |

OTHER PUBLICATIONS

Victoria User's Guide, Myriad Set v3.0, Draft, Apple Computer, Inc., 2006, 20 pages.

* cited by examiner

FIG. 6B

| TERMINAL ID | USER NAME |
|---|---|
| TERMINAL 1 | TARO |
| TERMINAL 2 | JIRO |
| ... | ... |

| TERMINAL ID | NUMBER OF STEPS |
|---|---|
| TERMINAL 1 | W1 |
| TERMINAL 2 | W2 |
| ... | ... |

| TERMINAL ID | NUMBER OF STEPS | DATE AND TIME |
|---|---|---|
| TERMINAL 2 | W2 | DATE AND TIME 1 |
| TERMINAL 4 | W3 | DATE AND TIME 2 |
| ... | ... | ... |

D3

F I G. 8
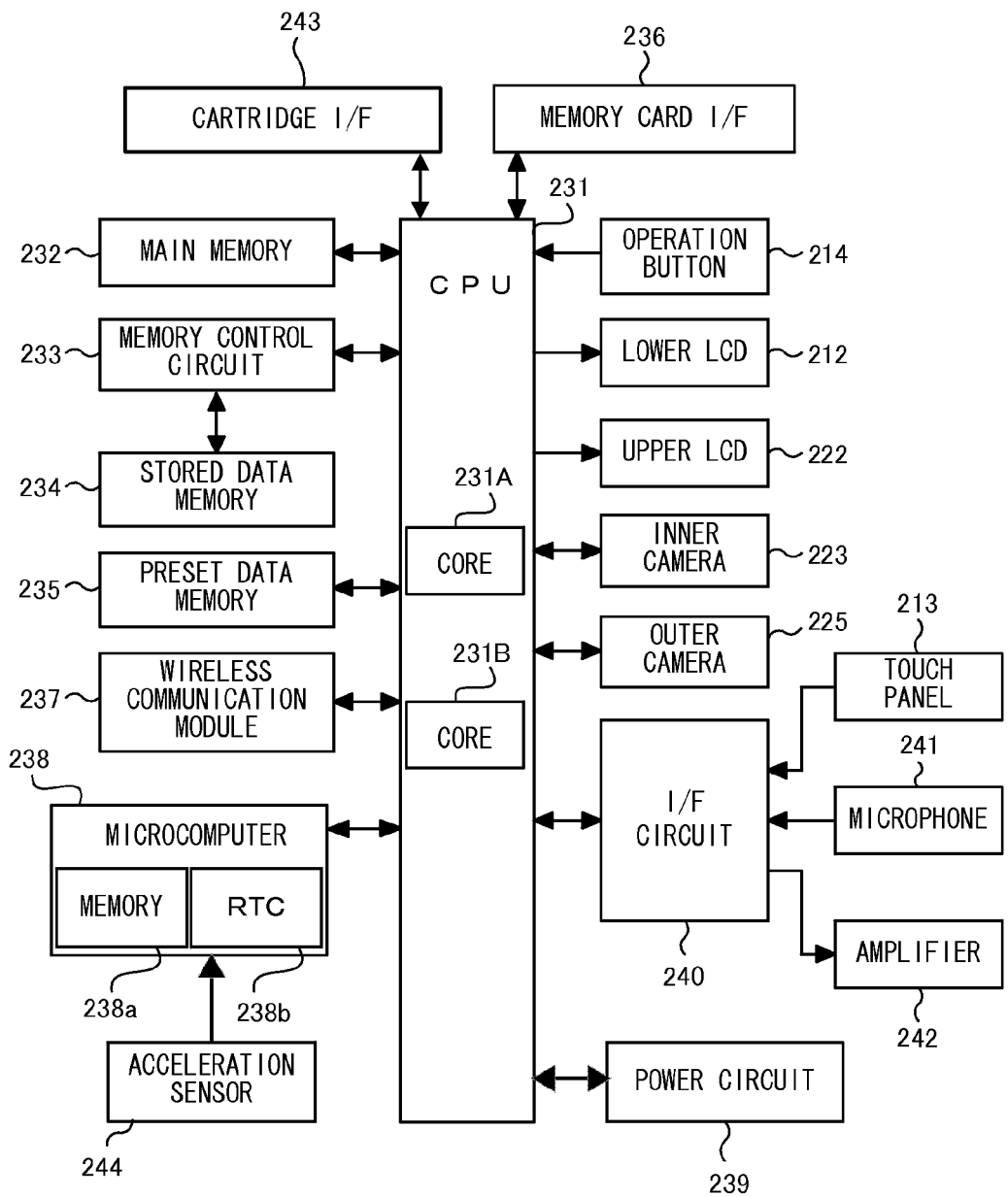

TERMINAL BEACON FRAME

MOVEMENT INFORMATION REQUEST FRAME

MOVEMENT INFORMATION FRAME

MOVEMENT INFORMATION

SERVICE INFORMATION FRAME

PASSING INFORMATION FRAME

INFORMATION PROCESSING SYSTEM AND INFORMATION PROCESSING METHOD

CROSS REFERENCE TO RELATED APPLICATIONS

This application is a continuation of U.S. patent application Ser. No. 14/575,424 filed Dec. 18, 2014; which is a continuation of U.S. patent application Ser. No. 13/253,337 filed Oct. 5, 2011, now U.S. Pat. No. 8,948,065; which claims priority from Japanese Patent Application No. 2010-284685 filed Dec. 21, 2010. The disclosures of the prior applications are incorporated herein by reference.

FIELD

The exemplary embodiments described herein relate to an information processing system and an information processing method in which a stationary information processing apparatus and a handheld information processing apparatus wirelessly communicate with each other.

BACKGROUND AND SUMMARY

Conventionally, an information processing system which includes a stationary information processing apparatus and a handheld information processing apparatus and in which wireless communication is performed between these apparatuses is widely known. For example, a system including a stationary game apparatus and a handheld game apparatus is disclosed, and in the system, the handheld game apparatus transmits data indicating the number of steps having been taken by a user in a predetermined time period (integrated data) to the stationary game apparatus by wireless communication. In this system, while the handheld game apparatus is located within a communicable range with the stationary game apparatus, when the handheld game apparatus receives an operation indicating a transmission instruction from the user, the handheld game apparatus transmits data indicating the number of steps to the stationary game apparatus. Then, the stationary game apparatus performs a process of displaying the content of the received data.

As described above, the conventional system is configured such that the handheld game apparatus transmits information to the stationary game apparatus after the user has made an operation, and then the stationary game apparatus performs information processing for displaying the content of the data indicating the number of steps. Therefore, the conventional system has a problem in that it cannot perform information processing by automatically determining that the user has returned after having gone out with the handheld game apparatus and, which causes a troublesome operation for the user.

Therefore, a feature of the exemplary embodiment relates to providing an information processing system and an information processing method that can automatically perform predetermined information processing in such a case where a user returns home after having gone out with a handheld information processing apparatus. Another feature of the exemplary embodiment relates to providing an information processing system and an information processing method in which, on a condition that the handheld information processing apparatus has gone out of the communicable range with the stationary information processing apparatus and has entered the communicable range again, the stationary information processing apparatus performs information processing based on this condition when the condition is satisfied, and thus can determine that the user has returned home.

(1) In order to realize the above features, the information processing system according to the exemplary embodiment includes a handheld information processing apparatus and a stationary information processing apparatus. The handheld information processing apparatus includes a first communication section and a first determination section. The stationary information processing apparatus includes a second communication section, a second determination section, and an information processing section. Here, the first communication section performs wireless communication with the stationary information processing apparatus. The first determination section determines whether the wireless communication with the stationary information processing apparatus is possible. The second communication section performs wireless communication with the handheld information processing apparatus. The second determination section determines whether the wireless communication with the handheld information processing apparatus is possible. The information processing section performs predetermined information processing, based on the determination by the second determination section, when the wireless communication with the handheld information processing apparatus has become, after having become disabled, enabled again.

According to the above configuration, in the stationary information processing apparatus, the predetermined information processing is performed when the wireless communication with the handheld information processing apparatus has become, after having become disabled, enabled again. Accordingly, for example, when the handheld information processing apparatus has gone out of the communicable range with the stationary information processing apparatus, the stationary information processing apparatus determines that the wireless communication with the handheld information processing apparatus has become disabled. Then, when the handheld information processing apparatus has entered the communicable range with the stationary information processing apparatus again, the stationary information processing apparatus determines that the communication with the handheld information processing apparatus has become enabled again. Then, when it is determined that the communication with the handheld information processing apparatus has become enabled again, the predetermined information processing is performed. Therefore, on the condition that when after having gone out of the communicable range with the stationary information processing apparatus, the handheld information processing apparatus has entered the communicable range again as a result of the user moving with the handheld information processing apparatus (when the condition is satisfied), the stationary information processing apparatus can perform information processing based on this condition. Therefore, for example, in such a case where the user went out with the handheld information processing apparatus, and has returned home, the predetermined information processing can be performed.

(2) As another configuration example of the exemplary embodiment, the information processing section may at least perform a process, as the predetermined information processing, for announcing to a user that after having gone out of a wireless communication range with the second communication section, the handheld information processing apparatus has become located within the wireless communication range again. According to this configuration, when the user has gone away from the location (for example, from the user's own house) at which the stationary information processing apparatus is set, while carrying the handheld information processing apparatus and has approached the location again, the condition is satisfied that after having gone out of the communicable range with the stationary information processing apparatus, the handheld information processing apparatus has entered the communicable range again. Then, when this condition is satisfied, it becomes possible to announce to a user of the stationary information processing apparatus that after having gone out of the wireless communication range with the second communication section (for example, after the user has gone out), the handheld information processing apparatus has become located within the wireless communication range again (for example, the user has returned home).

(3) As another configuration example of the exemplary embodiment, the handheld information processing apparatus may further include a number of steps measuring section and a number-of-steps data storage section. Here, the number-of-steps data storage section stores number-of-steps data obtained by the number of steps measuring section. Then, based on the determination by the first determination section, when the wireless communication with the stationary information processing apparatus has become, after having become disabled, enabled again, the first communication section may transmit the number-of-steps data to the stationary information processing apparatus. Further, the information processing section may perform the predetermined information processing when the number of steps indicated by the number-of-steps data satisfies a predetermined criterion.

According to the above configuration, the predetermined information processing is performed only when the number of steps indicated by the number-of-steps data satisfies the predetermined criterion. Here, the number-of-steps data indicates the number of steps of the user carrying the handheld information processing apparatus, that is, the movement amount of the user. Therefore, when the number-of-steps data satisfies the predetermined criterion, it is highly possible that the cause of the stationary information processing apparatus having become, after the communication with the handheld information processing apparatus has been disabled, able to communicate with the handheld information processing apparatus again, is that after having gone out of the communicable range with the stationary information processing apparatus, the handheld information processing apparatus has entered the communicable range again. Accordingly, the predetermined information processing is performed only when the number of steps indicated by the number-of-steps data satisfies the predetermined criterion. Therefore, in a case where after having become unable to communicate with the handheld information processing apparatus due to other reasons such as deterioration of communication condition, the stationary information processing apparatus has become able to communicate with the handheld information processing apparatus again, the predetermined information processing is not allowed to be performed. In this manner, effective determination of the condition that the user has returned home can be performed.

(4) As another configuration example of the exemplary embodiment, the information processing section may perform the predetermined information processing when the number of steps indicated by the number-of-steps data is greater than a predetermined number. Here, when the number of steps indicated by the number-of-steps data is greater than the predetermined value, it means that the amount of the movement of the user carrying the handheld information processing apparatus is large. Therefore, in this case, it is highly possible that the stationary information processing apparatus has become, after having become unable to communicate with the handheld information processing apparatus, able to communicate with the handheld information processing apparatus again, because the handheld information processing apparatus has entered, after having gone out of the communicable range with the stationary information processing apparatus, the communicable range again. According to the above configuration, the predetermined information processing is performed when the number of steps indicated by the number-of-steps data is greater than the predetermined number. This can effectively prevent an erroneous detection from being performed, in such a case where after having become unable to communicate with the handheld information processing apparatus due to deterioration of the communication condition, the stationary information processing apparatus has become able to communicate with the handheld information processing apparatus again, which is not the case where the user has returned home.

(5) As another configuration example of the exemplary embodiment, the number of steps measuring section may reset the number-of-steps data stored in the number-of-steps data storage section, after the transmission of the number-of-steps data by the first communication section has been completed. Here, the number-of-steps data is used for obtaining the movement amount of the user during the time period when the handheld information processing apparatus has been unable to communicate with the stationary information processing apparatus. Therefore, after the number-of-steps data is transmitted after the stationary information processing apparatus has become able to communicate with the handheld information processing apparatus again, the value indicated by the number-of-steps data becomes useless. In the above configuration, since the number-of-steps data is reset at the timing of this transmission, it is possible to prevent the value of the number-of-steps data from increasing without limitation, and to reset the value of the number-of-steps data at an appropriate timing.

(6) As another configuration example of the exemplary embodiment, the information processing section may measure an elapsed time since the wireless communication with the handheld information processing apparatus has become disabled, and may perform the predetermined information processing when an elapsed time at a time when the wireless communication with the handheld information processing apparatus has become enabled again satisfies a predetermined criterion. According to this configuration, the predetermined process is performed only when an elapsed time at a time when the wireless communication with the handheld information processing apparatus has become, after having been disabled, enabled again satisfies the predetermined criterion. That is, the predetermined process is performed only when the elapsed time satisfies a predetermined criterion, or the predetermined process is performed only when the elapsed time satisfies a predetermined criterion and the number-of-steps data satisfies a predetermined criterion. Accordingly, a configuration may be employed in which when the elapsed time is greater than a criterion value, the predetermined process is performed. Alternatively, a configuration may be employed in which when the elapsed time is less than the criterion value but the number-of-steps data is greater than a criterion value, an exceptional process is performed, considering that the user dishonestly increased the value of the number-of-steps data by vigorously shaking the handheld information processing apparatus, and the like. Accordingly, it is possible to effectively prevent an erroneous detection.

(7) As another configuration example of the exemplary embodiment, the information processing section may perform the predetermined information processing when the elapsed time is greater than a value of the predetermined criterion. Here, in a case where the elapsed time at a time when the wireless communication with the handheld information processing apparatus has become, after having been disabled, enabled again is less than or equal to a criterion value, it is highly possible that the handheld information processing apparatus has been unable to communicate with the stationary information processing apparatus due to temporal deterioration of the communication condition. According to this configuration, when the elapsed time is greater than the value of the predetermined criterion, the predetermined information processing is performed. Therefore, it is effectively prevent an erroneous detection from being performed when the handheld information processing apparatus has been unable to communicate with the stationary information processing apparatus due to such a cause as temporal deterioration of the communication condition.

(8) As another configuration example of the exemplary embodiment, the first communication section may further perform communication with another apparatus while the communication with the stationary information processing apparatus is not being performed. Then, the handheld information processing apparatus may further include an other apparatus data storage section for storing other apparatus data obtained through the communication with the other apparatus. The first communication section may further transmit the other apparatus data to the stationary information processing apparatus. According to this configuration, during the time period when the handheld information processing apparatus is located outside the communicable range with the stationary information processing apparatus, the handheld information processing apparatus can obtain other apparatus data through communication with the other apparatus. Then, when the handheld information processing apparatus has become able to communicate with the stationary information processing apparatus again, the other apparatus data is transmitted to the stationary information processing apparatus. Accordingly, the stationary information processing apparatus can obtain information from the other apparatus that is not in its own wireless communication range, and in addition, can obtain other apparatus data that the handheld information processing apparatus has obtained during the time period when the handheld information processing apparatus has been located outside the communicable range with the stationary information processing apparatus.

(9) As another configuration example of the exemplary embodiment, the other apparatus may be a wireless access point set at a predetermined location. The other apparatus data may be location information regarding the location at which the access point is set. The information processing section may perform the predetermined information processing when the location information satisfies a predetermined criterion. Here, in order to receive the other apparatus data from the access point, the handheld information processing apparatus has to be located at a distance that allows wireless communication with the access point. Therefore, the other apparatus data indicating the location at which the access point is set, which is received from the access point, indicates the movement amount of the handheld information processing apparatus. According to the above configuration, when the other apparatus data indicating the movement amount of the handheld information processing apparatus satisfies a predetermined criterion, the predetermined information processing is performed. Therefore, it is possible to effectively prevent an erroneous detection from being performed.

(10) As another configuration example of the exemplary embodiment, the other apparatus may be another handheld information processing apparatus. The other apparatus data may be information processing data obtained from the other handheld information processing apparatus. The information processing section may perform the predetermined information processing based on the information processing data. According to this configuration, the handheld information processing apparatus can transmit the information processing data obtained by receiving form the other handheld information processing apparatus, to the stationary information processing apparatus. Then, the stationary information processing apparatus performs the predetermined information processing based on the received information processing data. Accordingly, the predetermined information processing can be performed based on the other apparatus data that the handheld information processing apparatus obtained from the other handheld information processing apparatus during the time period when the handheld information processing apparatus is located outside the communicable range with the stationary information processing apparatus. For example, in a case where the other apparatus data indicates information of the handheld information processing apparatus that is the source of the other apparatus data, if the stationary information processing apparatus announces the information indicated by the other apparatus data, it is possible to allow the user of the stationary information processing apparatus to know the information of the other handheld information processing apparatus that the user of the handheld information processing apparatus has passed.

(11) As another configuration example of the exemplary embodiment, the stationary information processing apparatus and the handheld information processing apparatus may be a stationary game apparatus and a handheld game apparatus, respectively, which each perform game processing. According to this configuration, the handheld game apparatus is readily carried by the user in order to perform a game while the user is out. Moreover, the predetermined information processing can be performed while the user of the stationary game apparatus is playing a game.

(12) As another configuration example of the exemplary embodiment, the stationary game apparatus may further include a network connection section, a game data obtaining section, and a game data storage section. Here, the network connection section connects to an external network. The game data obtaining section obtains game data via the external network. The game data storage section stores the game data obtained by the game data obtaining section. The information processing section may transmit the game data via the second communication section to the handheld game apparatus. According to this configuration, even in a state where the handheld information processing apparatus is unable to communicate with an external network (for example, in a case where the handheld information processing apparatus does not include the function of communicating with an external network), the handheld information processing apparatus can obtain game data from an external network and use the game data in a game processing.

(13) As another configuration example of the exemplary embodiment, the handheld information processing apparatus may further include an acceleration sensor. The number of steps measuring section may detect the number of steps based on an acceleration detected by the acceleration sensor. According to this configuration, it is possible to measure the number of steps of the user by use of the acceleration sensor which is used by the handheld information processing apparatus in the game processing.

(14) In order to realize the above features, an information processing method according to the exemplary embodiment includes a first communication step, a first determination step, a second communication step, a second determination step, and an information processing step. Here, in the first communication step, a handheld information processing apparatus performs wireless communication with a stationary information processing apparatus by use of a first communication section of the handheld information processing apparatus. In the first determination step, the handheld information processing apparatus determines whether the wireless communication with the stationary information processing apparatus is possible. In the second communication step, the stationary information processing apparatus performs wireless communication with the handheld information processing apparatus by use of a second communication section of the stationary information processing apparatus. In the second determination step, the stationary information processing apparatus determines whether the wireless communication with the handheld information processing apparatus is possible. In the information processing step, the stationary information processing apparatus performs predetermined information processing, based on the determination in the second determination step, when the wireless communication with the handheld information processing apparatus has become, after having become disabled, enabled again. This configuration provides the same functions and effects as those provided by the information processing system in (1).

(15) As another configuration example of the exemplary embodiment, the information processing section may at least perform a process, as the predetermined information processing, for announcing to a user that after having gone out of a wireless communication range with the second communication section, the handheld information processing apparatus has become located within the wireless communication range again. This configuration provides the same functions and effects as those provided by the information processing system in (2).

(16) As another configuration example of the exemplary embodiment, the information processing method may further include a number-of-steps data storing step of the handheld information processing apparatus storing number-of-steps data obtained by a number of steps measuring section of the handheld information processing apparatus. The information processing method may further include a step of the handheld information processing apparatus transmitting the number-of-steps data to the stationary information processing apparatus by use of the first communication section, based on the determination by the first determination section, when the wireless communication with the stationary information processing apparatus has become, after having become disabled, enabled again. In addition, in the information processing step, the stationary information processing apparatus may perform the information processing when the number of steps indicated by the number-of-steps data satisfies a predetermined criterion. This configuration provides the same functions and effects as those provided by the information processing system in (3).

(17) As another configuration example of the exemplary embodiment, in the information processing step, the stationary information processing apparatus performs the predetermined information processing when the number of steps indicated by the number-of-steps data is greater than a predetermined number. This configuration provides the same functions and effects as those provided by the information processing system in (4).

(18) As another configuration example of the exemplary embodiment, the information processing method further includes a step of the handheld information processing apparatus resetting the number-of-steps data stored in the number-of-steps data storing step, after the transmission of the number-of-steps data by the first communication section has been completed. This configuration provides the same functions and effects as those provided by the information processing system in (5).

(19) As another configuration example of the exemplary embodiment, according to the information processing method, in the information processing step, the stationary information processing apparatus measures an elapsed time since the wireless communication with the handheld information processing apparatus has become disabled, and performs the predetermined information processing when an elapsed time at a time when the wireless communication with the handheld information processing apparatus has become enabled again satisfies a predetermined criterion. This configuration provides the same functions and effects as those provided by the information processing system in (6).

(20) As another configuration example of the exemplary embodiment, according to the information processing method, in the information processing step, the stationary information processing apparatus performs the predetermined information processing when the elapsed time is greater than a value of the predetermined criterion. This configuration provides the same functions and effects as those provided by the information processing system in (7).

(21) As another configuration example of the exemplary embodiment, the information processing method may further include a step of the handheld information processing apparatus communicating with another apparatus by use of the first communication section while the communication with the stationary information processing apparatus is not being performed. In addition, the information processing method may further include an other apparatus data storing step of the handheld information processing apparatus storing other apparatus data obtained through the communication with the other apparatus. Further, the handheld information processing apparatus may further include a step of the handheld information processing apparatus transmitting the other apparatus data to the stationary information processing apparatus by use of the first communication section. This configuration provides the same functions and effects as those provided by the information processing system in (8).

(22) As another configuration example of the exemplary embodiment, in the information processing method, the other apparatus may be a wireless access point set at a predetermined location. In addition, in the information processing method, the other apparatus data may be location information regarding the location at which the access point is set. In addition, in the information processing step, the stationary information processing apparatus may perform the predetermined information processing when the location information satisfies a predetermined criterion. This configuration provides the same functions and effects as those provided by the information processing system in (9).

(23) As another configuration example of the exemplary embodiment, in the information processing method, the other apparatus may be another handheld information processing apparatus. The other apparatus data may be information processing data obtained from the other handheld information processing apparatus. In the information processing step, the stationary information processing apparatus may perform the predetermined information processing based on the information processing data. This configuration provides the same functions and effects as those provided by the information processing system in (10).

(24) As another configuration example of the exemplary embodiment, in the information processing method, the stationary information processing apparatus and the handheld information processing apparatus may be a stationary game apparatus and a handheld game apparatus, respectively, which each perform game processing. This configuration provides the same functions and effects as those provided by the information processing system in (11).

(25) As another configuration example of the exemplary embodiment, the information processing method may further include a network connecting step, a game data obtaining step, a game data storing step, and a game data transmitting step. Here, in network connecting step, the stationary game apparatus connects to an external network. In the game data obtaining step, the stationary game apparatus obtains game data via the external network. In the game data storing step, the stationary game apparatus stores the game data obtained in the game data obtaining step. In the game data transmitting step, the information processing section transmits the game data via the second communication section to the handheld game apparatus. This configuration provides the same functions and effects as those provided by the information processing system in (12).

(26) As another configuration example of the exemplary embodiment, according to the information processing method, the handheld information processing apparatus may further include an acceleration sensor. In addition, the information processing method may include a step of the handheld information processing apparatus detecting, by use of the number of steps measuring section, the number of steps based on an acceleration detected by the acceleration sensor. This configuration provides the same functions and effects as those provided by the information processing system in (13).

According to the exemplary embodiment, the predetermined information processing is performed when the stationary information processing apparatus has become, after having been unable to communicate with the handheld information processing apparatus, able to wirelessly communicate with the handheld information processing apparatus again. Therefore, on a condition that the handheld information processing apparatus has entered, after having gone out of the communicable range with the stationary information processing apparatus, the communicable range again (when this condition is satisfied), the stationary information processing apparatus can perform the information processing in accordance with this condition. Therefore, at a timing when the handheld information processing apparatus has entered, after having gone out of the communicable range with the stationary information processing apparatus, the communicable range again, the stationary information processing apparatus can perform information processing by use of the information that the handheld information processing apparatus has entered, after having gone out of the communicable range with the stationary information processing apparatus, the communicable range again. For example, it is possible to perform information processing, automatically responding to the user's returning home, thereby allowing to possible to provide the user with a highly entertaining process result.

These and other features, aspects and advantages of the certain exemplary embodiments will become more apparent from the following detailed description of the certain exemplary embodiments when taken in conjunction with the accompanying drawings.

BRIEF DESCRIPTION OF THE DRAWINGS

FIG. 6B shows a non-limiting example of a user terminal table;

FIG. 6C shows a non-limiting example of an at-home terminal table;

FIG. 6D shows a non-limiting example of a communication-disabled terminal table;

FIG. 8 is a block diagram showing a non-limiting example of an internal configuration of a non-limiting exemplary handheld terminal;

DETAILED DESCRIPTION OF NON-LIMITING EXAMPLE EMBODIMENTS

Configuration of Return Home Notification System

Figure 1:
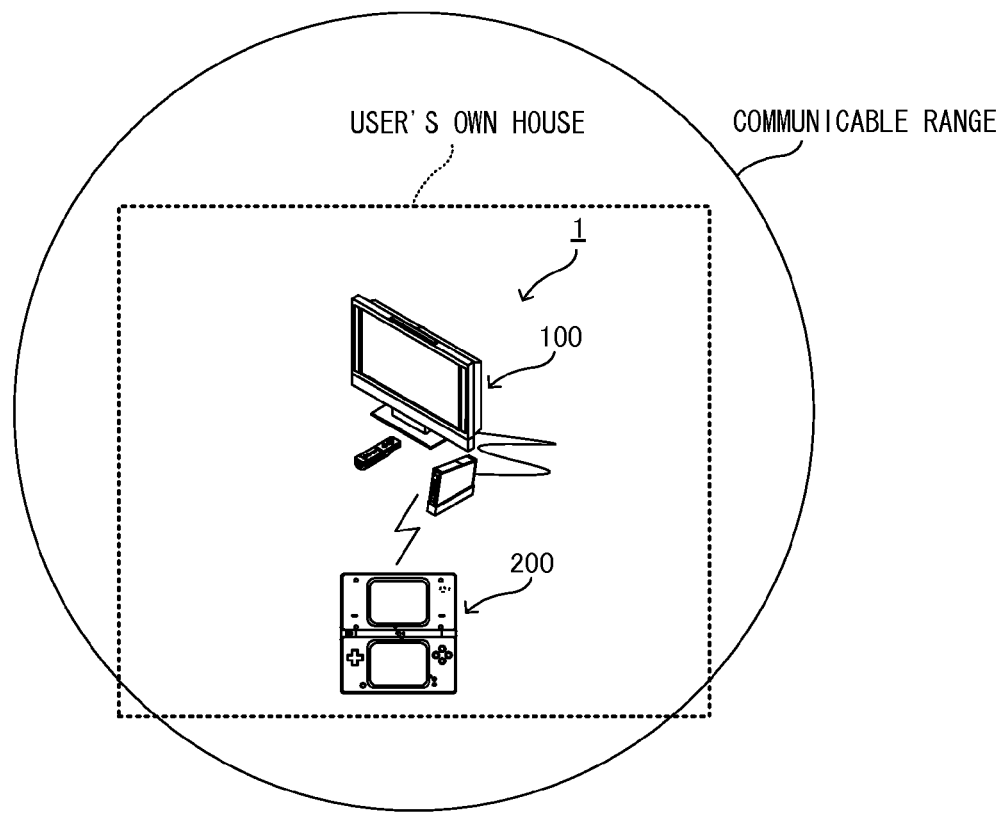
FIG. 1 shows a non-limiting exemplary configuration of a return home notification system according to an exemplary embodiment.

Hereinafter, a basic configuration of a return home notification system according to an exemplary embodiment will be described with reference to FIG. 1. FIG. 1 shows a non-limiting exemplary configuration of a return home notification system according to the exemplary embodiment. A return home notification system 1 includes a stationary game system 100 and a handheld game apparatus 200 (hereinafter referred to as "handheld terminal 200"), and the stationary game system 100 and the handheld terminal 200 can transmit and receive data to and from each other through wireless communication. The game system 100 is set at a fixed location in a user's house or the like and is not assumed to be moved by being carried by the user. On the other hand, the handheld terminal 200 is configured to be able to be moved by being carried by the user. The location at which the game system 100 is set is not limited to the user's house, and may be another indoor place such as an office or an outdoor place.

A feature of the exemplary embodiment is that while the handheld terminal 200 continues to be able to wirelessly communicate with the game system 100, the game system 100 determines that the handheld terminal 200 continues to be located within a range where wireless communication therebetween is possible (communicable range), that is, the user of the handheld terminal 200 is near the game system 100 (for example, being at home). Then, when the handheld terminal 200 has become able to, after having become unable to communicate with the game system 100, communicate the game system 100 again, the game system 100 determines that the handheld terminal 200 which went out of the communicable range has returned, that is, the user of the handheld terminal 200 has returned to a place near the game system 100 (for example, the user has returned home). Then, the game system 100 performs information processing in accordance with the return of the user of the handheld terminal 200 (returning home). This information processing is, for example, a process for announcing to (notifying) a user near the location of the game system 100 (another user staying at home, for example, a user performing a game using the game system 100) that the user has returned (returning home). It should be noted that "the user has returned" is not limited to that "the user has returned to his or her own house". However, hereinafter, description will be given of an exemplary embodiment in which that "the user has returned to his or her own house" is determined and announced. Hereinafter, with reference to FIG. 2, an example of a method for announcing that "the user has returned to his or her own house" will be described.

Figure 2:
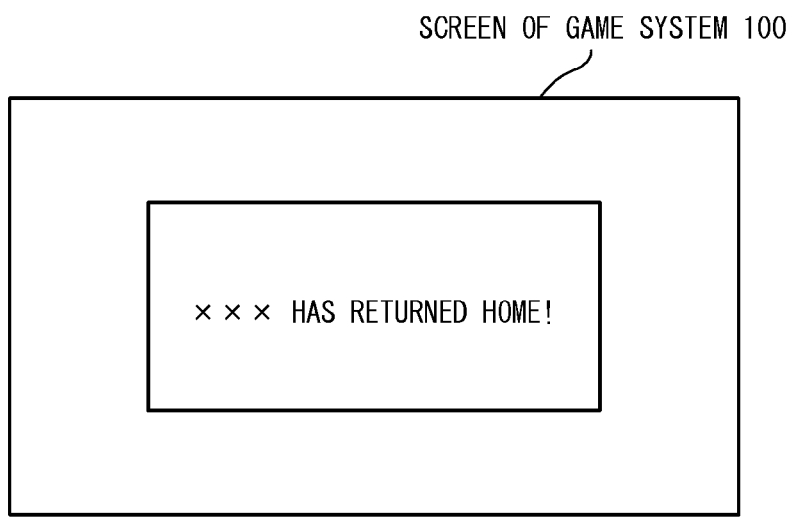
FIG. 2 shows a non-limiting example of a screen of a game system displaying a notification of a user's returning home.

FIG. 2 shows a non-limiting example of a screen of the game system 100 displaying a notification of the user's returning home. With reference to FIG. 2, "the user (xxx) has returned home!" is displayed on the screen of the game system 100, with the user name (xxx) of the handheld terminal 200 displayed. It should be noted that in order to display the user name, a setting registration is needed to be performed in advance (before the above described returning-home/being-at-home determination is performed). However, without performing the setting registration in advance, "returned home!" may be displayed without specifying the user name. In the exemplary embodiment, the returning home of the user of the handheld terminal 200 is announced by means of the display on the screen of the game system 100. However, any method may be used as long as the returning home of the user can be announced. For example, the returning home of the user may be announced by a method in which the game system 100 outputs a sound or lights a lamp (a marker 108 or the like described below), or the like. Further, in the exemplary embodiment, the returning home is announced to a different user than the user of the handheld terminal 200 (that is, another user staying at home). However, a configuration may be employed in which, for example, a return home message such as "Hello, xxx!" is shown to the user of the handheld terminal 200.

In the exemplary embodiment, the game system 100 performs a process of determining whether the handheld terminal 200 is at home or has returned home and announcing the returning home of the handheld terminal 200, only in a state where the power is on (hereinafter referred to as "stationary apparatus side return home notification process"). However, the game system 100 may perform the stationary apparatus side return home notification process while being in a low-power stand-by mode (power-saving state in which power is supplied only to a part of components).

As described above, when the handheld terminal 200 has returned after having gone out of the communicable range with the game system 100 (when the handheld terminal 200 has become able to, after becoming unable to, communicate with the game system 100), the return home notification system 1 determines that the user of the handheld terminal 200 has returned home. Therefore, it is preferable that the communicable range between the handheld terminal 200 and the game system 100 substantially coincides with or is slightly greater than the area of the user's own house. Therefore, in the exemplary embodiment, the handheld terminal 200 and the game system 100 wirelessly communicate with each other by means of short-range wireless communication (for example, wireless communication whose communicable distance is 10 to 30 m). However, the communicable distance is not limited to 10 to 30 m, and may be shorter or longer than this. Moreover, the exemplary embodiment is configured such that the handheld terminal 200 and the game system 100 perform wireless communication with each other in an ad-hoc mode (direct communication not via access points). However, the handheld terminal 200 and the game system 100 may communicate with each other in an infrastructure mode (via access points).

Further, as another feature of the exemplary embodiment, the game system 100 does not determine that the user of the handheld terminal 200 has returned home, only on a condition that the handheld terminal 200 has become able to, after having become unable to communicate once, communicate again. The game system 100 also uses another factor regarding the handheld terminal 200 (hereinafter referred to as "return home determination factor") to determine the user's returning home. That is, only when the return home determination factor satisfies a predetermined criterion, it is determined that the user of the handheld terminal 200 has returned home, and a process for informing the returning home of the user is performed. The reason for this is as follows. In a case where the game system 100 is configured to determine the returning home of the user of the handheld terminal 200 only on the condition that the handheld terminal 200 has become, after having become unable to communicate once, able to communicate again, if the user turns off the power of the handheld terminal 200 once and then turns it on while the user is at home, or if the user has moved to a place within the house where the radio wave from the game system 100 is difficult to reach (when communication condition is bad), it may erroneously be determined that the user went out of the house and has returned home. Therefore, in the exemplary embodiment, the return home determination factor that indicates whether the user has moved or not is also used in determination of the user's returning home, thereby effectively preventing erroneous determination.

Figure 3:
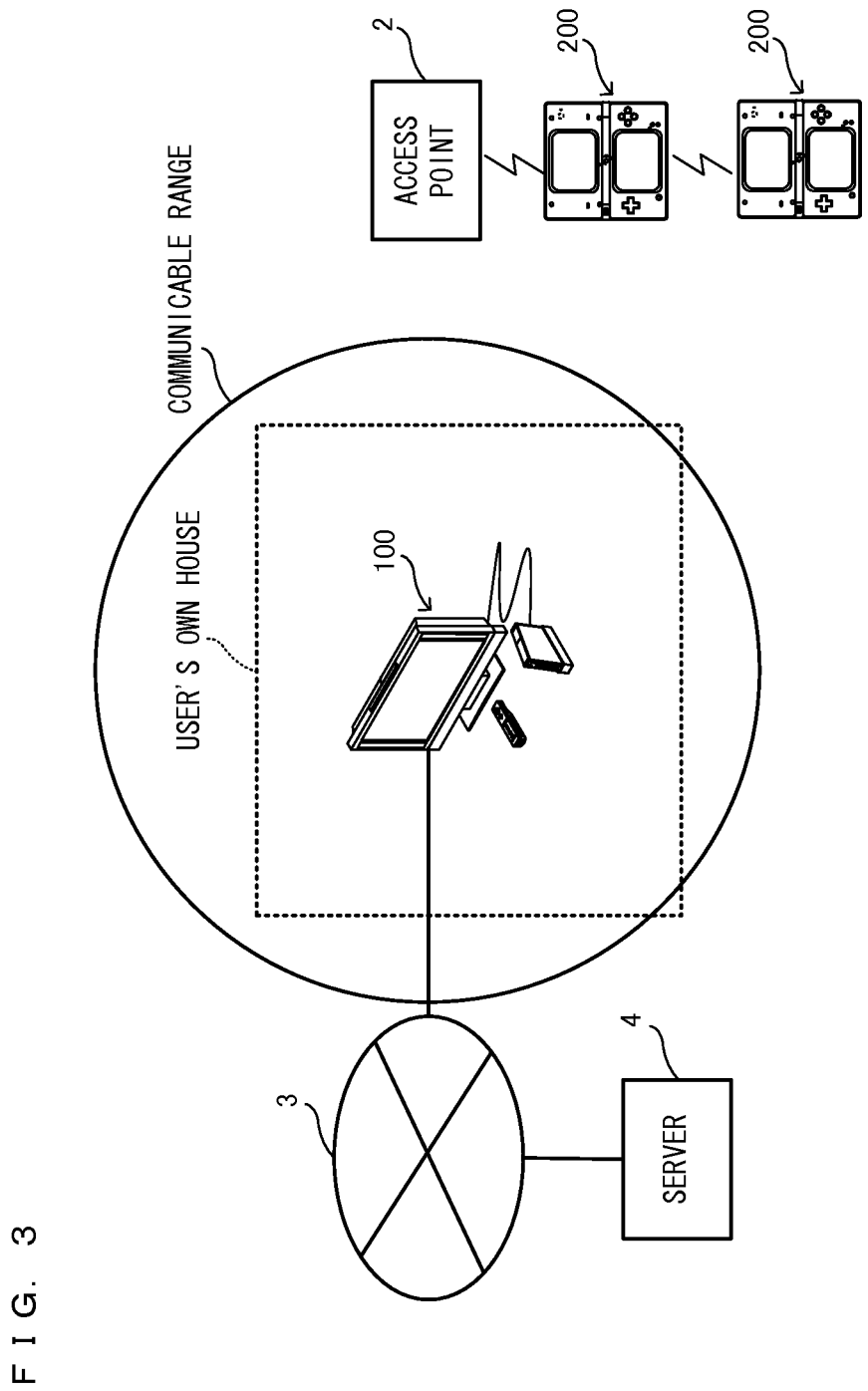
FIG. 3 shows a non-limiting example of a game system and a handheld terminal, and another communication apparatus with which the game system and the handheld terminal communicate.

Hereinafter, with reference to FIG. 3, another feature of the exemplary embodiment will be described. FIG. 3 shows a non-limiting example of the game system 100 and the handheld terminal 200, and another communication apparatus with which the game system 100 and the handheld terminal 200 communicate. While being located within the radio wave coverage of an access point 2 fixedly set at an outside place, the handheld terminal 200 receives information from the access point 2 (hereinafter referred to as "access point location information"). The access point location information (corresponds to an example of "other apparatus data" according to the certain exemplary embodiments) is information indicating the location at which the access point 2 is set. In this exemplary embodiment, the access point location information is also used as the return home determination factor. That is, when the handheld terminal 200 becomes able to communicate with the game system 100 again and connection with the game system 100 has been established, the handheld terminal 200 transmits the access point location information to the game system 100. Then, when the location indicated by the access point location information from the handheld terminal 200 and the location of the game system 100 is separated by a predetermined distance or more, the game system 100 determines that the user of the handheld terminal 200 has returned home.

Further, the handheld terminal 200 includes a number-of-steps measuring function, and measures the number of steps of the user of the handheld terminal 200. In the exemplary embodiment, the measured number of steps of the user is used as the return home determination factor. Specifically, when the handheld terminal 200 has become able to communicate with the game system 100 again and communication with the game system 100 has been established, the handheld terminal 200 transmits number-of-steps data indicating the measured number of steps to the game system 100. Then, based on the number of steps indicated by the number-of-steps data received from the handheld terminal 200, the game system 100 calculates the number of steps taken by the user during the period while the communication was disabled. If the number of steps is greater than a predetermined threshold value (hereinafter referred to as "threshold value w1"), it is determined that the user of the handheld terminal 200 went out and has returned home.

Further, the game system 100 measures an elapsed time from the time when the handheld terminal 200 went out of the communicable range (from the time communication became disabled) to the time when the handheld terminal 200 has retuned to be included in the communicable range (when communication has become enabled again). Then, the game system 100 uses this elapsed time as the return home determination factor. In the exemplary embodiment, even in a case where the number of steps calculated based on the above number-of-steps data is less than or equal to the threshold value w1, if the elapsed time is greater than a predetermined value, and if the number of steps calculated based on the above number-of-steps data is greater than a threshold value w2 (the threshold value w2<the threshold value w1), the game system 100 determines that the user of the handheld terminal 200 has returned home. It should be noted that, instead of or in addition to the above configuration, the following configuration may be employed: in a case where the elapsed time is less than a predetermined value, if the number of steps calculated based on the above number-of-steps data is greater than a predetermined threshold value, it is considered that the user has dishonestly increased the number-of-steps data by, for example, vigorously shaking the handheld terminal 200 with a hand, and thus the game system 100 determines that it is not the case where the user of the handheld terminal 200 went out and has returned home.

As described above, in the exemplary embodiment, the game system 100 determines returning home of the user who uses the handheld terminal 200, in consideration of the return home determination factor. Therefore, in the exemplary embodiment, it is possible to eliminate the disadvantage that although the user of the handheld terminal 200 is actually at home, the returning home of the user is erroneously determined by the game system 100 and announcement thereof is made.

Further, the exemplary embodiment has the following feature. That is, the game system 100 is connected to an external network 3 such as the Internet, and downloads service information periodically and automatically from a server 4 connected so as to be able to communicate with the game system 100 via the external network 3. The service information includes, for example, game data used to execute a game application on the game system 100 and/or the handheld terminal 200. The game data includes, for example, data of items that can be used in a game, data of works that won prizes at contests which invited public participation of users (work data). The work data is, for example, map data generated by execution of a map edit application, and the map data indicates, for example, a map such as a racing course for a racing game, and is used by a racing game application.

Upon determining that the user of the handheld terminal 200 has returned home, the game system 100 transmits the service information to the handheld terminal 200. Accordingly, the handheld terminal 200 can obtain at a latest timing the service information accumulated in the game system 100 while the user is not at home.

As still another feature of the exemplary embodiment, the handheld terminal 200 can perform wireless communication in an ad-hoc mode with other handheld terminals 200 of the same type (hereinafter referred to as "passing communication"), and can transmit and receive information (hereinafter referred to as "passing information") with said other handheld terminals 200. The passing information (corresponding to an example of "other apparatus data" according to the certain exemplary embodiments) includes, for example, information of characters (avatar and the like) generated by the users of the handheld terminals 200 executing a predetermined character edit application, and information for identifying an application most immediately used by a handheld terminal 200.

Then, upon determining that the user of the handheld terminal 200 has returned home, the game system 100 requests the handheld terminal 200 to transmit the passing information received from said other handheld terminals 200. Accordingly, the game system 100 can obtain at the latest timing the passing information obtained by the handheld terminal 200 while having been out. It should be noted that, at this time, the handheld terminal 200 may transmit to the game system 100 images captured by a built-in camera (an inner camera 223 and an outer camera 225 described below with reference to FIG. 8) included in the handheld terminal 200, in addition to the passing information. The game system 100 performs a process of displaying the received passing information or the received captured images on the screen of the game system 100.

Further, the game system 100 transmits the passing information received from the handheld terminal 200 to the server 4. Accordingly, the server 4 can easily obtain the passing information, and can generate statistic data based on the passing information. The statistic data is used by an administrator of the server 4 and the statistic data may be distributed to the game system 100 as service information.

It should be noted that each of FIG. 1 shows only one handheld terminal 200. However, in the exemplary embodiment, the return home notification system 1 includes a plurality of the handheld terminals 200 and returning home of the users of the handheld terminals 200 are determined. However, the return home notification system 1 may include only one handheld terminal 200 and returning home of the only one handheld terminal 200 may be determined.

(Overall Configuration of the Game System 100)

Figure 4:
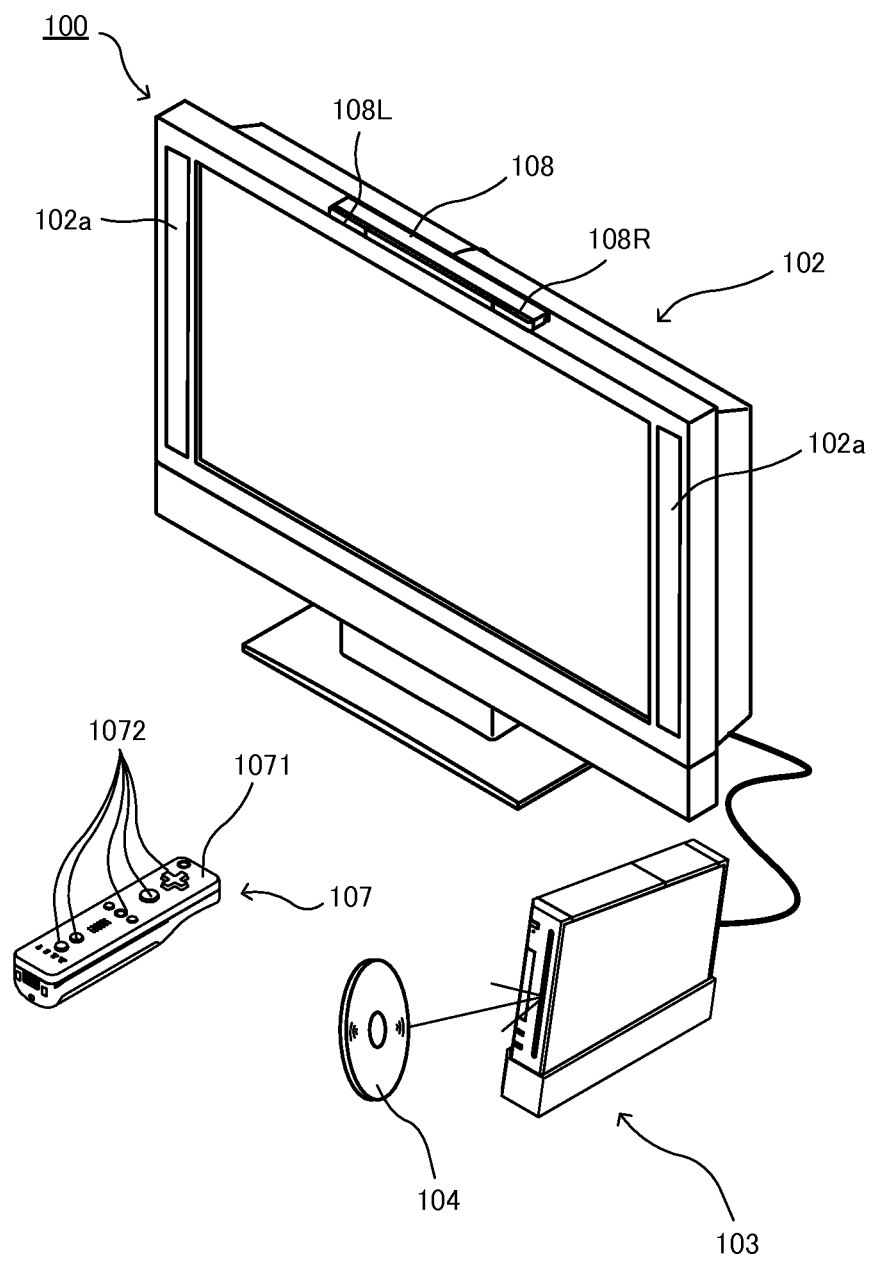
FIG. 4 is an external view of a non-limiting exemplary game system.

With reference to FIG. 4, the game system 100 will be described. FIG. 4 is an external view of a non-limiting example of the game system 100. As shown in FIG. 4, the game system 100 includes a television receiver (hereinafter, referred to simply as a "television") 102, a stationary game apparatus 103 (corresponding to a non-limiting example of the "stationary information processing apparatus" according to the certain exemplary embodiments), an optical disc 104, a controller 107, and a marker section 108. In the present system 100, a game process is executed on the game apparatus 103 in accordance with a game operation using the controller 107.

Into the game apparatus 103, the optical disc 104, which typifies an information storage medium and is exchangeable with respect to the game apparatus 103, is detachably inserted. In the optical disc 104, the game program executed on the game apparatus 103 is stored. The game apparatus 103 has, on the front surface thereof, an opening through which the optical disc 104 is inserted. The game processing is executed on the game apparatus 103 by reading and executing the game program stored in the optical disc 104 which is inserted in the game apparatus 103 through the opening.

The game apparatus 103 is connected via a connection cord to the television 102 typifying a display device. The television 102 displays a game image generated through the game processing executed on the game apparatus 103, and at the same time, a sound relating to the game is outputted from two speakers 102a of the television 102. Further, the marker section 108 is provided in the vicinity of the screen of the television 102 (on the top surface of the screen shown in FIG. 4). The marker section 108 includes two markers, a marker 108R and a marker 108L, at both ends thereof. Specifically, each of the markers 108R and 108L includes at least one infrared LED, and outputs infrared light forward from the television 102. The marker section 108 is connected to the game apparatus 103, and the game apparatus 103 is capable of controlling each infrared LED included in the marker section 108 so as to be lit up.

The controller 107 includes a housing 1071 and a plurality of operation buttons 1072 provided on a surface of the housing 1071, and supplies, to the game apparatus 103, operation data representing a content of an operation performed therein. The controller 107 is connected to the game apparatus 103 by wireless communication. In the exemplary embodiment, for example, the Bluetooth (registered trademark) technology is used for the wireless communication between the controller 107 and the game apparatus 103. In another exemplary embodiment, the controller 107 and the game apparatus 103 may communicate with each other by a wired connection.

(Internal Configuration of the Game Apparatus 103)

Figure 5:
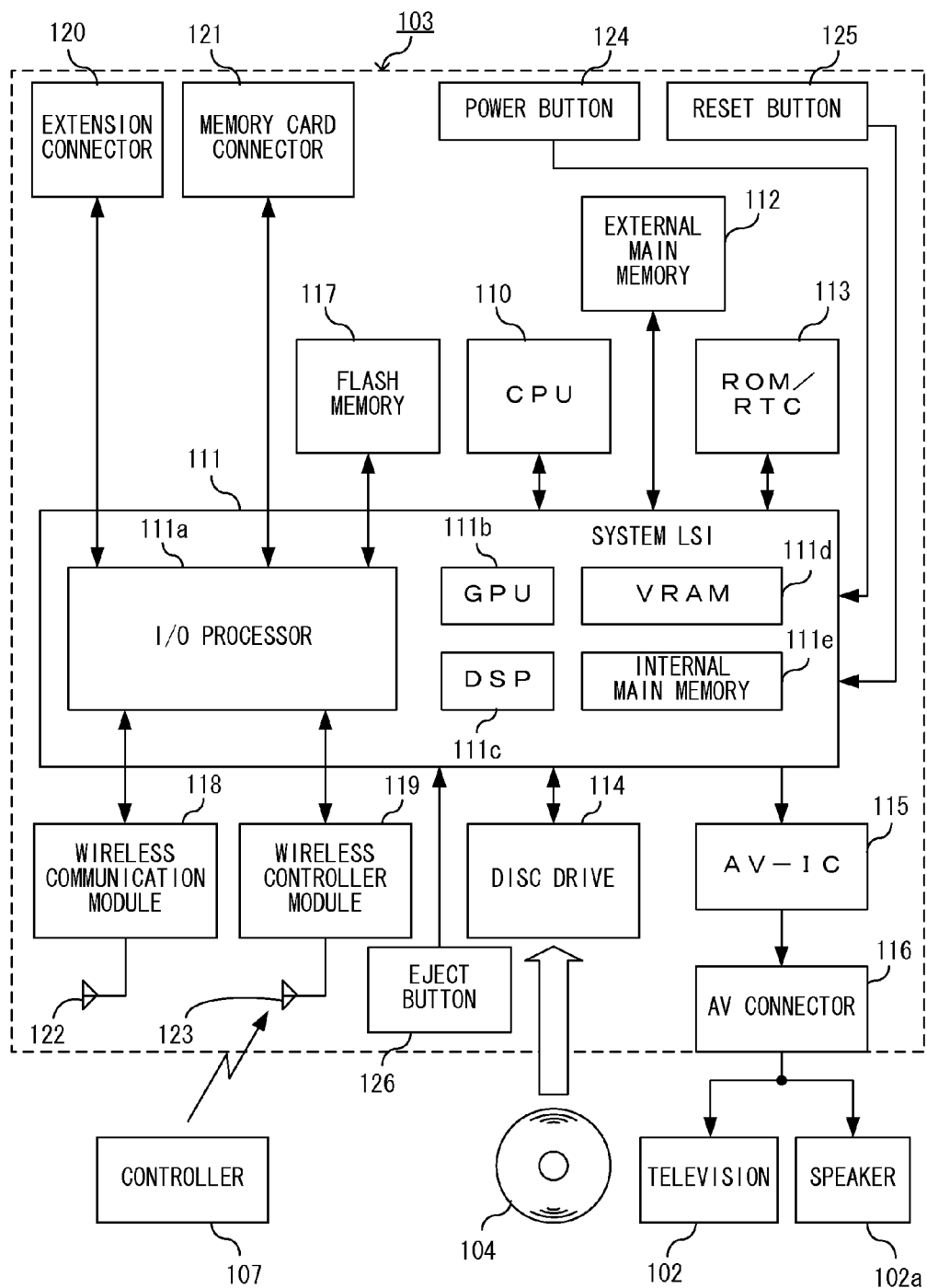
FIG. 5 is a block diagram of a non-limiting exemplary configuration of a game apparatus.

Subsequently, with reference to FIG. 5, an internal configuration of the game apparatus 103 will be described. FIG. 5 is a block diagram illustrating a non-limiting exemplary configuration of the game apparatus 103. The game apparatus 103 includes a CPU 110, a system LSI 111, an external main memory 112, a ROM/RTC 113, a disc drive 114, an AV-IC 115, and the like.

The CPU 110, serving as a game processor, executes the game program stored in the optical disc 104 so as to perform the game processing. The CPU 110 is connected to the system LSI 111. In addition to the CPU 110, the external main memory 112, the ROM/RTC 113, the disc drive 114, and the AV-IC 115 are also connected to the system LSI 111. The system LSI 111 performs processing such as control of data transmission between respective components connected thereto, generation of an image to be displayed, and acquisition of data from an external apparatus. An internal configuration of the system LSI 111 will be described below. The external main memory 112, which is of a volatile type, stores a game program read from the optical disc 104 or a flash memory 117, programs, such as a stationary apparatus side return home notification program described below, and various data, and is used as a work area and a buffer area for the CPU 110. The ROM/RTC 113 includes a ROM (so-called boot ROM) incorporating a program for booting the game apparatus 103, and a clock circuit (RTC: real time clock) for counting time. The disc drive 114 reads, from the optical disc 104, program data, texture data and the like, and writes the read data into an internal main memory 111e described below or the external main memory 112.

Provided in the system LSI 111 are an input/output processor (I/O processor) 111a, a GPU (Graphics Processor Unit) 111b, a DSP (Digital Signal Processor) 111c, a VRAM 111d, and the internal main memory 111e. These components 111a to 111e are connected to each other via an internal bus which is not shown.

The GPU 111b, which is a part of rendering means, generates an image in accordance with a graphics command (draw command) from the CPU 110. More specifically, the GPU 111b performs, in accordance with the graphics command, computing processing required for displaying 3D graphics, for example, processing of coordinate conversion from 3D coordinates into 2D coordinates which is performed prior to rendering, and processing of rendering such as attaching texture, thereby generating game image data. In addition to the graphics command, the CPU 110 provides the GPU 111b with an image generation program required for generating the game image data. The VRAM 111d stores therein data (such as polygon data and texture data) necessary for the GPU 111b to execute the graphics command. When an image is to be generated, the GPU 111b generates image data by using the data stored in the VRAM 111d.

The DSP 111c functions as an audio processor, and generates audio data using sound data and sound waveform (tone color) data which are stored in the internal main memory 111e and the external main memory 112. Like the external main memory 112, the internal main memory 111e stores a program and various data, and is used as a work area and a buffer area for the CPU 110.

The image data and the audio data generated as described above are read by the AV-IC 115. The AV-IC 115 outputs the read image data to the television 102 via an AV connector 116, and also outputs the read audio data to a speaker 102a of the television 102. Thus, an image is displayed on the television 102, and a sound is outputted from the speaker 102a.

The I/O processor 111a executes data reception and transmission between the components connected thereto and download of data from an external apparatus. The I/O processor 111a is connected to the flash memory 117, a wireless communication module 118, a wireless controller module 119, an extension connector 120, and a memory card connector 121. To the wireless communication module 118, an antenna 122 is connected, and to the wireless controller module 119, an antenna 123 is connected.

The I/O processor 111a can perform wireless communication between another communication apparatus via the wireless communication module 118 and the antenna 122. For example, the I/O processor 111a can perform wireless communication with the handheld terminal 200 in an ad-hoc mode (directly, not via an access point). Further, the I/O processor 111a can be connected to the external network 3 via a wireless LAN router not shown (see FIG. 3) and can communicate with other game apparatuses and various servers (including the server 4) connected to the external network 3. The I/O processor 111a accesses the flash memory 117 at regular time intervals so as to detect presence or absence of data which is required to be transmitted to the external network 3. When such data is present, the data is transmitted to the external network 3 via the wireless communication module 118 and the antenna 122. Further, when receiving the passing information from the handheld terminal 200, the I/O processor 111a transmits the passing information to the server 4 in accordance with an instruction from the CPU 110.

Further, the I/O processor 111a receives, via the network 3, the wireless LAN router not shown, the antenna 122 and the wireless communication module 118, data transmitted from another game apparatus or data downloaded from the above various servers (including the above service information), and stores the received data in the flash memory 117. The CPU 110 executes the game program to read the data stored in the flash memory 117, thereby using the read data on the game program. The flash memory 117 may store not only the data transmitted and received between the game apparatus 103 and another game apparatus or various servers, but also saved data (result data or intermediate step data of the game) of a game played with the game apparatus 103.

The CPU 110 performs the above described stationary apparatus side return home notification process by use of the I/O processor 111a. The stationary apparatus side return home notification process will be described in detail below.

Further, the I/O processor 111a receives the operation data transmitted from the controller 107, via the antenna 123 and the wireless controller module 119, and (temporarily) stores the operation data in a buffer area of the internal main memory 111e or the external main memory 112.

Further, the extension connector 120 and the memory card connector 121 are connected to the I/O processor 111a. The extension connector 120 is an interface connector as typified by a USB and an SCSI, and is capable of performing communication with the network, instead of the wireless communication module 118, by connecting thereto a medium such as an external storage medium, a peripheral device such as another controller, or a wired communication connector. That is, the transmission and reception of information to and from the server 4 can be performed via a connector for a wired communication, instead of the wireless communication module 118 and the antenna 122. The memory card connector 121 is a connector for connecting thereto the external storage medium such as a memory card. For example, the I/O processor 111a accesses the external storage medium via the extension connector 120 or the memory card connector 121, so as to store data in the external storage medium or to read data from the external storage medium.

The game apparatus 103 is provided with a power button 124, a reset button 125, and an eject button 126. The power button 124 and the reset button 125 are connected to the system LSI 111. When the power button 124 is turned on, electric power is supplied to each component of the game apparatus 103 via an AC adaptor (not shown). In the state where the power has been turned on, if the power button 124 is pressed, the game apparatus 103 shifts to a low power standby mode. Even in the low power standby mode, electric power is supplied to the game apparatus 103. Because electric power is always supplied to the game apparatus 103, the game apparatus 103 can be always connected to a network such as the Internet even in this state. For turning off the power after the power is turned on, the power button 124 is pressed for a predetermined time period or longer. The reset button 125 is pressed to cause the system LSI 111 to restart a boot program of the game apparatus 103. The eject button 126 is connected to the disc drive 114. The eject button 126 is pressed to eject the optical disc 104 from the disc drive 114.

Next, the controller 107 will be described. With reference to FIG. 4, as described above, the controller 107 includes the housing 1071 and the plurality of operation buttons 1072 provided on the surface of the housing 1071 and, in addition, has a built-in acceleration sensor (not shown), and therefore, the controller 107 can detect its own orientation, and the like. On a front surface of the housing 1071 (the further side in the drawing is the front), an image pickup element (not shown) constituting a part of an imaging information calculation section (not shown) is provided. The imaging information calculation section (not shown) is a system for analyzing image data of an image taken by the controller 107, identifying an area having a high brightness in the image and detecting a position of a center of gravity, a size and the like of the area, thereby generating processing result data indicating the detection result. The imaging information calculation section has, for example, a maximum sampling period of about 200 frames/sec, and therefore can trace and analyze even a relatively fast motion of the controller 107.

Then, the controller 107 functions as a wireless controller by performing wireless communication with the game apparatus 103. The controller 107 transmits to the game apparatus 103 various types of operation data (key data, acceleration data, process result data) indicating operations inputted by the user based on a predetermined communication standard such as, for example, Bluetooth (registered trademark), every predetermined cycle (for example, 5 ms).

(Memory Map of the Game Apparatus 103)

Figure 6A:
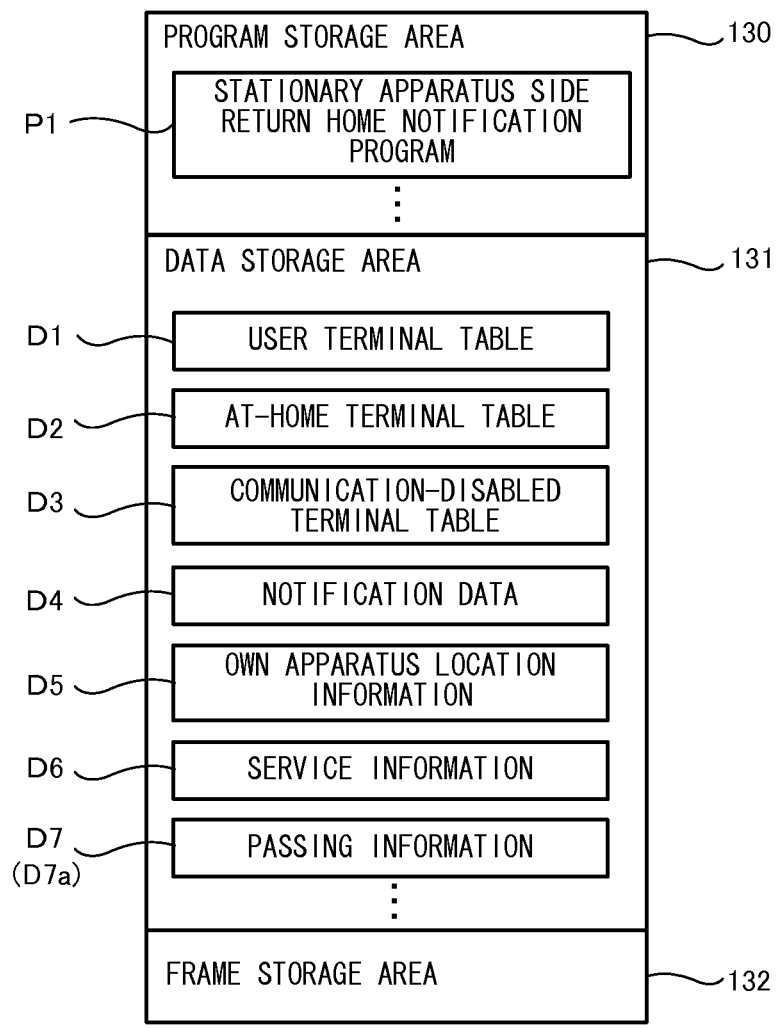
FIG. 6A is a memory map showing a non-limiting example of a program and data stored in an internal main memory and/or an external main memory.

Hereinafter with reference to FIG. 6A to FIG. 6D, a program and data stored in the internal main memory 111e and/or the external main memory 112 will be described. FIG. 6A is a memory map showing a non-limiting example of a program and data stored in the internal main memory 111e and/or the external main memory 112. Each of the internal main memory 111e and/or the external main memory 112 includes a program storage area 130, a data storage area 131, and a frame storage area 132. The program storage area 130 stores a stationary apparatus side return home notification program P1 for causing the game apparatus 103 (CPU 110) to perform the stationary apparatus side return home notification process.

The data storage area 131 stores a user terminal table D1, an at-home terminal table D2, a communication-disabled terminal table D3, notification data D4, own apparatus location information D5, service information D6, and passing information D7, by the CPU 110 executing the stationary apparatus side return home notification program P1.

The user terminal table D1 shows handheld terminals 200 each registered as a terminal that performs determination on its user's being at home or returning home. FIG. 6B shows a non-limiting example of the user terminal table D1. In the user terminal table D1, a terminal ID (for example, MAC address) unique to a corresponding handheld terminal 200 that performs determination on the user's being at home or returning home, and a user name corresponding to this terminal ID are registered. Hereinafter, a handheld terminal 200 registered in the user terminal table D1 may be referred to as a "handheld terminal 200 used as a user terminal". By the user performing an operation of setting registration on the handheld terminal 200 and the game apparatus 103, the CPU 110 performs a process (setting registration process) of obtaining the terminal ID and the user name set for the handheld terminal 200 from the handheld terminal 200, and of storing the obtained information in the user terminal table D1.

With reference back to FIG. 6A, the at-home terminal table D2 is a table showing handheld terminals 200 that have been determined as being able to communicate in the stationary apparatus side return home notification process. FIG. 6C shows a non-limiting example of the at-home terminal table D2. In the at-home terminal table D2, a terminal ID of a corresponding handheld terminal 200 being at home and the number of steps indicated by corresponding number-of-steps data transmitted from this terminal ID are registered, associated with each other. As described above, during the time period until a handheld terminal 200 goes out of the communicable range with the game apparatus 103, the user of the handheld terminal 200 is at home. The terminal ID of a handheld terminal 200 that is at home during this time period is registered in the at-home terminal table D2. Hereinafter, a handheld terminal 200 registered in the at-home terminal table D2 may be referred to as an "at-home handheld terminal 200". Here, the determination whether the handheld terminal 200 is at home or has returned home is performed only with respect to "handheld terminals 200 used as user terminals". Therefore, the handheld terminals 200 shown in the at-home terminal table D2 are always included in the handheld terminals 200 shown in the user terminal table D1.

The number-of-steps data is transmitted from an at-home handheld terminal 200 to the game apparatus 103, every time the game apparatus 103 performs wireless communication with the at-home handheld terminal 200, whereby the number of steps in the at-home terminal table D2 is updated by this number-of-steps data.

With reference back to FIG. 6A, the communication-disabled terminal table D3 shows handheld terminals 200 that were at-home handheld terminals 200 but have become unable to communicate. FIG. 6D shows a non-limiting example of a communication-disabled terminal table D3. In the communication-disabled terminal table D3, the terminal ID of a corresponding handheld terminal 200 that was an at-home handheld terminal 200 but has become unable to communicate, the number of steps registered in the at-home terminal table D2, and the date and time when the communication was disabled (latest date and time) are registered, associated with one another. The reason why the number of steps registered in the at-home terminal table D2 is registered is as follows. That is, in a case where the user of a handheld terminal 200 who was at home, went out, and then returned home, the difference between the number of steps indicated by the number-of-steps data received from this handheld terminal 200 and the number of steps registered in the at-home terminal table D2 is obtained, whereby the number of steps taken by the user of the handheld terminal 200 during the time period while the communication was disabled is obtained. Then, based on the obtained difference (this number of steps), the game apparatus 103 determines whether the user of the handheld terminal 200 went out.

Here, the determination whether the communication was disabled is performed only with respect to at-home handheld terminals 200. Therefore, the handheld terminals 200 shown in the communication-disabled terminal table D3 are always included in the handheld terminals 200 shown in the at-home terminal table D2. It should be noted that a handheld terminal 200 included in the communication-disabled terminal table D3 may be referred to as a "communication-disabled handheld terminal 200".

With reference back to FIG. 6A, the notification data D4 is data used for announcing the returning home of the user of the handheld terminal 200 (for example, for displaying the screen as shown in FIG. 2), and is, for example, text data to be superimposed on a game image. The notification data D4 may be sound data and the like for announcing the returning home of the user of the handheld terminal 200.

The own apparatus location information D5 is information indicating the location at which the game apparatus 103 is set (for example, latitude and longitude information). This information is obtained, for example, in the following manner. That is, the user inputs the address of the location (user's own house) at which the game apparatus 103 is set, the game apparatus 103 transmits this address to the server 4, whereby own apparatus location information D5 corresponding to the address is obtained and stored. It should be noted that the own apparatus location information D5 is not limited to the latitude and longitude information as long as the own apparatus location information D5 indicates the location at which the game apparatus 103 is set. For example, the own apparatus location information D5 may be information indicating an address and the like. The service information D6 is information downloaded from the server 4. The passing information D7 (D7a) is information that is received from the handheld terminal 200, which has been obtained by this handheld terminal 200 performing passing communication with other handheld terminals 200.

The frame storage area 132 is an area for temporally storing communication frames (frames D21 to D26 shown in FIG. 10B to FIG. 10G) to be transmitted by the game apparatus 103 to the handheld terminal 200 or to be received by the game apparatus 103 from the handheld terminal 200. The communication frames will be described in detail below with reference to FIG. 10B to FIG. 10G.

It should be noted that the stationary apparatus side return home notification program P1 and data D1 to D6 are read, for example, from the flash memory 117 and are stored in the program storage area 130 and the data storage area 131.

(Configuration of the Handheld Terminal 200)

Figure 7:
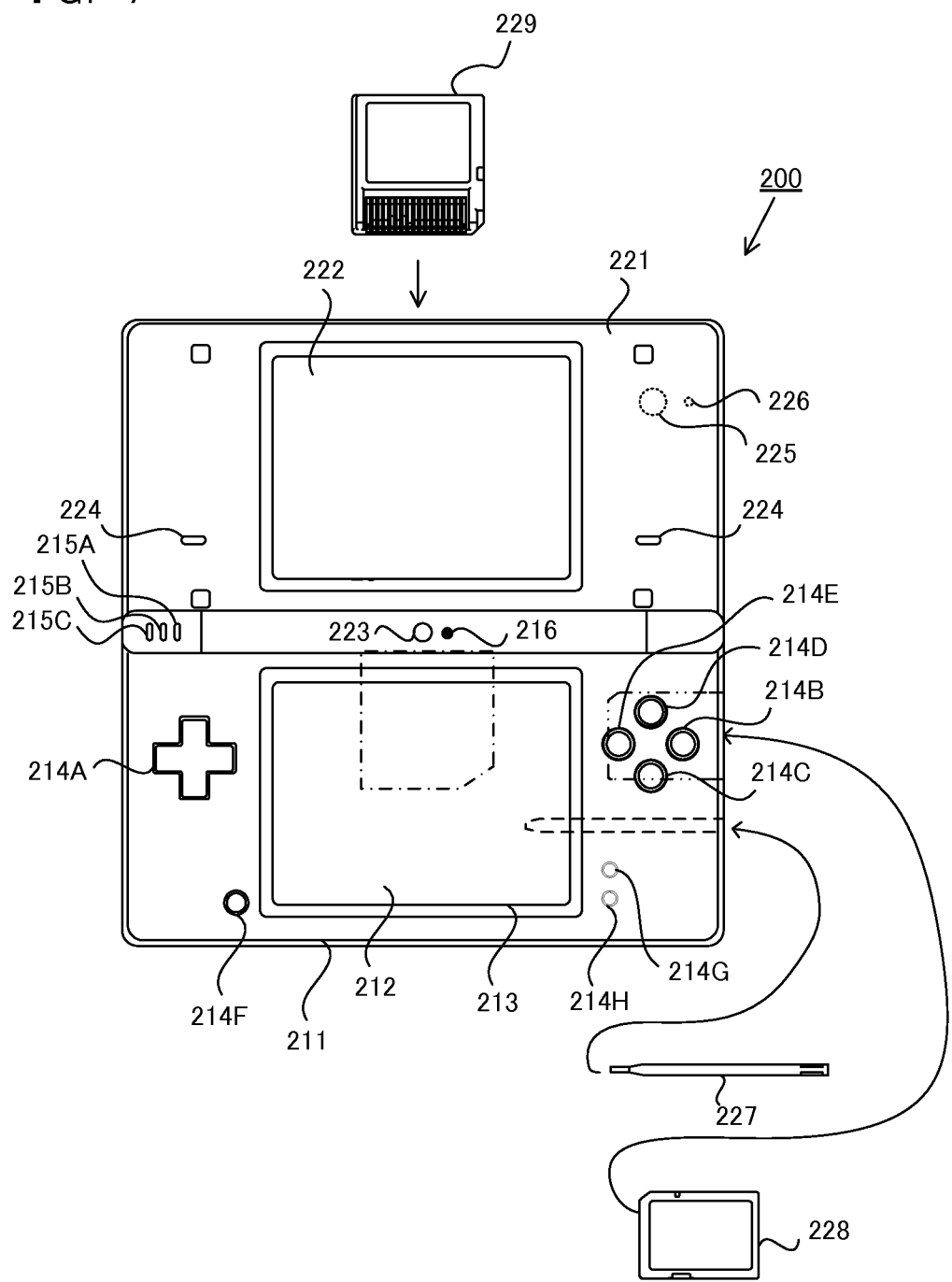
FIG. 7 is an external view of a non-limiting exemplary handheld terminal.

FIG. 7 is an external view of the handheld terminal 200. By performing a handheld terminal side return home notification program, the handheld terminal 200 functions as a handheld information processing apparatus according to the certain exemplary embodiments.

FIG. 7 shows the handheld terminal 200 which is a foldable handheld game apparatus and which is in an opened state. The handheld terminal 200 is formed in a size that allows the user to hold it with their one or both hands even when the handheld terminal 200 is in the opened state.

The handheld terminal 200 includes a lower housing 211 and an upper housing 221. The lower housing 211 and the upper housing 221 are connected to each other in a manner that allows them to be opened and closed (i.e., foldable). In the example of FIG. 7, the lower housing 211 and the upper housing 221 are each formed in a plate-like shape of a horizontally long rectangle, and are rotatably connected at their longer sides. Normally, the user uses the handheld terminal 200 in the opened state. When not using the handheld terminal 200, the user keeps the handheld terminal 200 in the closed state. In the example of FIG. 7, the state of the handheld terminal 200 is not limited to the opened or closed state. For example, with friction force occurring at the connection between the lower housing 211 and the upper housing 221, the handheld terminal 200 can be maintained to be in an intermediate state between the opened state and the closed state, at any angle formed by the lower housing 211 and the upper housing 221. In other words, the upper housing 221 can be caused to remain stationary at any angle with respect to the lower housing 211.

In the lower housing 211, a lower LCD (Liquid Crystal Display) 212 is provided. The lower LCD 212 has a horizontally long shape, and is arranged such that the orientation of the longer sides thereof coincides with the orientation of the longer sides of the lower housing 211. Although the LCD is used as a display device to be incorporated in the handheld terminal 200 in the exemplary embodiment, any other display device, such as a display device using an EL (Electro Luminescence), may be used, for example. In the handheld terminal 200, a display device having any resolution may be used. Although details will be described below, the lower LCD 212 is used for displaying, in real time, an image captured by the inner camera 223 or the outer camera 225.

Operation buttons 214A to 214K and a touch panel 213 are provided in the lower housing 211 as input devices. The operation buttons 214A to 214E are used for a determination operation, a cancellation operation, and the like. The power button 214F is used to power ON/OFF the handheld terminal 200. The start button 214G, and the select button 214H are used for performing various operations with the handheld terminal 200.

It should be noted that the operation buttons 214I to 214K are not shown in FIG. 7. For example, the operation button 214I that is an L-button is provided on a left end portion of an upper side surface of the lower housing 211, and the operation button 214J that is an R-button is provided on a right end portion of the upper side surface of the lower housing 211. The L-button 214I and the R-button 214J are used for, e.g., performing an operation of instructing the handheld terminal 200 to capture an image (i.e., a shutter operation). Further, the operation button 214K that is a sound volume button is provided on a left side surface of the lower housing 211. The sound volume button 214K is used to adjust the sound volume of loudspeakers included in the handheld terminal 200.

The handheld terminal 200 further includes the touch panel 213 as a different input device from the operations buttons 214A to 214K. The touch panel 213 is mounted so as to cover the screen of the lower LCD 212. In the exemplary embodiment, a resistive film type touch panel is used as the touch panel 213, for example. However, the touch panel 213 is not limited to the resistive film type touch panel, but any press-type touch panel may be used. In a right side surface of the lower housing 211, an insertion opening (indicated by a dashed line in FIG. 7) for accommodating a stylus pen 227 is provided.

In the right side surface of the lower housing 211, an insertion opening (indicated by a two-dot chain line in FIG. 7) for accommodating a memory card 228 is further provided. Inside the insertion opening, a connector (not shown) is provided for electrically connecting the handheld terminal 200 and the memory card 228. The memory card 228 is, for example, an SD (Secure Digital) memory card, and detachably attached to the connector. The memory card 228 is used, for example, for storing (saving) an image captured by the handheld terminal 200, and loading an image generated by another apparatus into the handheld terminal 200.

Further, in the upper side surface of the lower housing 211, an insertion opening (indicated by a dashed-dotted line in FIG. 7) is provided for accommodating a cartridge 229. Inside the insertion opening, a connector (not shown) is provided for electrically connecting the handheld terminal 200 and the cartridge 229. The cartridge 229 is a storage medium in which a game program or the like is stored, and the cartridge 229 is detachably inserted into the insertion opening provided in the lower housing 211.

Three LEDs 215A to 215C are mounted at the left side portion of the connection between the lower housing 211 and the upper housing 221. Here, the handheld terminal 200 is capable of performing wireless communication with other apparatuses. The first LED 215A is lit up while the power of the handheld terminal 200 is ON. The second LED 215B is lit up while the handheld terminal 200 is being charged. The third LED 215C is lit up while the wireless communication is being established. Thus, the three LEDs 215A to 215C allow the user to be informed of a state of ON/OFF of the power of the handheld terminal 200, a state of charging of the handheld terminal 200, and a state of communication establishment of the handheld terminal 200.

Meanwhile, in the upper housing 221, an upper LCD 222 is provided. The upper LCD 222 has a horizontally long shape, and is arranged such that the orientation of the longer sides thereof coincides with the orientation of the longer sides of the upper housing 221. Similarly to the lower LCD 212, a display device of any type different from that of the upper LCD 222, or a display device having any resolution different from that of the upper LCD 222, may be used in place of the upper LCD 222. A touch panel may be provided so as to cover the upper LCD 222.

In the upper housing 221, two cameras (the inner camera 223 and the outer camera 225) are provided. As shown in FIG. 7, the inner camera 223 is mounted at an inner main surface of the upper housing 221, in the vicinity of the aforementioned connection. On the other hand, the outer camera 225 is mounted on a surface reverse to the inner main surface on which the inner camera 223 is mounted, that is, on the outer main surface of the upper housing 221 (which is a surface to be located at the outside of the handheld terminal 200 when the handheld terminal 200 is in the closed state and which is the back surface of the upper housing 221 shown in FIG. 7). In FIG. 7, the outer camera 225 is indicated by a dashed line.

In the inner main surface of the upper housing 221, near the aforementioned connection, a microphone (a microphone 241 shown in FIG. 8) is accommodated as a sound input device. Also, in the inner main surface of the upper housing 221, near the connection, a microphone hole 216 is formed so as to allow the microphone 241 to detect a sound outside the handheld terminal 200. The accommodating position of the microphone 241 and the position of the microphone hole 216 may not necessarily be located near the connection. For example, the microphone 241 may be accommodated in the lower housing 211, and the microphone hole 216 may be provided in the lower housing 211 so as to correspond to the accommodating position of the microphone 241.

On the outer main surface of the upper housing 221, a fourth LED 226 (indicated by a dashed line in FIG. 7) that is lit when the outer camera 225 captures an image is mounted.

In the inner main surface of the upper housing 221, sound holes 224 are formed to the right and left of the upper LCD 222, respectively, the upper LCD 222 being provided near the center of the inner main surface. Loudspeakers are accommodated in the upper housing 221 at the back of the sound holes 224, respectively. The sound holes 224 are holes for releasing sounds generated by the loudspeakers to the outside of the handheld terminal 200.

Next, an internal configuration of the handheld terminal 200 will be described with reference to FIG. 8. FIG. 8 is a block diagram showing a non-limiting example of the internal configuration of the handheld terminal 200.

As shown in FIG. 8, the handheld terminal 200 includes electronic components including a CPU (Central Processing Unit) 231, a main memory 232, a memory control circuit 233, a stored data memory 234, a preset data memory 235, a memory card interface (memory card I/F) 236 and a cartridge I/F 243, a wireless communication module 237, a real time clock (RTC) 238, a power circuit 239, an interface circuit (I/F circuit) 240, and the like. These electronic components are mounted on an electronic circuit substrate and accommodated in the lower housing 211 (or may be accommodated in the upper housing 221).

The CPU 231 is information processing means for executing a predetermined program (including the handheld terminal side return home notification program). The CPU 231 includes a core 231A for executing processes relating to communication, and a core 231B for executing applications. In the exemplary embodiment, a predetermined program is stored in a memory (e.g. the stored data memory 234) within the handheld terminal 200 or in the memory card 228 and/or the cartridge 229, and the core 231A performs communication processes (including a handheld terminal side return home notification process described below) using the wireless communication module 237 by executing the predetermined program. Further, the core 231B performs predetermined game processing by executing the game application.

Since the core 231A exclusively performs communication processes in the exemplary embodiment, communication processes with another communication apparatus can be performed while the core 231B is executing an application, irrespective of the processes being performed for the application. It should be noted that a program executed by the CPU 231 may be stored in advance in a memory within the handheld terminal 200, may be obtained from the memory card 228 and/or the cartridge 229, or may be obtained from another apparatus by means of communication with said another apparatus. For example, a program may be obtained by means of download via the Internet from a predetermined server, or may be obtained by downloading a predetermined program stored in the game apparatus 103 through communication therewith.

The main memory 232, the memory control circuit 233, and the preset data memory 235 are connected to the CPU 231. The stored data memory 234 is connected to the memory control circuit 233. The main memory 232 is storage means used as a work area and a buffer area of the CPU 231. In other words, the main memory 232 stores various data used in the above processes performed by the CPU 231, and also stores a program obtained from the outside (the memory cards 228 and 229, another apparatus, and the like). In the exemplary embodiment, for example, a PSRAM (Pseudo-SRAM) is used as the main memory 232. The stored data memory 234 is storage means for storing a program executed by the CPU 231, data of images taken by the inner camera 223 and the outer camera 225, and the like. The stored data memory 234 is constructed of a nonvolatile storage medium, for example, a NAND flash memory, in the exemplary embodiment. The memory control circuit 233 is a circuit for controlling reading of data from the stored data memory 234 or writing of data to the stored data memory 234 in accordance with an instruction from the CPU 231. The preset data memory 235 is storage means for storing data (preset data) of various parameters and the like which are set in advance in the handheld terminal 200.

A flash memory connected to the CPU 231 via an SPI (Serial Peripheral Interface) bus can be used as the preset data memory 235.

The memory card I/F 236 is connected to the CPU 231. The memory card I/F 236 reads data from the memory card 228 mounted on the connector or writes data to the memory card 228 in accordance with an instruction from the CPU 231. In the exemplary embodiment, data of images taken by the outer camera 225 is written to the memory card 228, and image data stored in the memory card 228 is read from the memory card 228 to be stored in the stored data memory 234.

The cartridge I/F 243 is connected to the CPU 231. The cartridge I/F 243 reads out data from the cartridge 229 mounted to the connector or writes data to the cartridge 229 in accordance with an instruction from the CPU 231. In the exemplary embodiment, an application program is read out from the cartridge 229 to be executed by the CPU 231, and data regarding the application program (e.g. saved data and the like) is written to the cartridge 229.

The wireless communication module 237 performs wireless communication with another communication apparatus. Here, the wireless communication module 237 performs wireless communication using a short-range wireless communication (for example, ISM (Industry-Science-Medical) band that uses, for example, weak radio waves which are allowed to be used without a radio station license. As such a communication method, in the exemplary embodiment, a method conformed to the standard of IEEE802.11.b/g and a unique communication method are used. However, the communication method is not limited thereto, and other communication methods may be used. The wireless communication module 237 is connected to the core 231A. The core 231A can transmit and receive data with another apparatus by use of the wireless communication module 237 via or not via the external network 3 (for example, the Internet).

For example, while being in a communicable range with the game apparatus 103 (for example, distance within 10 to 30 m), the wireless communication module 237 can transmit and receive data to and from the game apparatus 103 through wireless communication therewith. Moreover, the wireless communication module 237 can receive data (including the access point location information described above) from an access point 300.

Moreover, the wireless communication module 237 has a function of wirelessly communicate with a game apparatus of the same type. That is, while being located within a communicable range with another handheld terminal 200 (for example, distance within 10 to 30 m), the core 231A can transmit and receive information (the passing information D7 described above) to and from the other handheld terminal 200 by use of the wireless communication module 237. The transmission and reception of the passing information D7 is performed upon receiving an instruction from the user, and also repeatedly and automatically performed every predetermined cycle, not on the condition of receiving an instruction from the user. That is, the core 231A automatically searches for another handheld terminal 200 in the communicable range, automatically communicates with the found handheld terminal 200, and automatically transmits and receives data to and from the found handheld terminal 200. Then, after the communication is completed, the core 231A automatically disconnects the communication. The series of processes are repeated every predetermined cycle. Hereinafter, this communication will be referred to as "passing communication".

The passing communication process is performed while a plurality of handheld terminals 200 that perform communication are powered on. That is, the passing communication is performed also when the handheld terminal 200 is executing an application. This is because, the execution of the application is exclusively performed by the core 231B, and thus, the passing communication process can be performed by the core 231A in parallel with the execution process of the application. It should be noted that also while the handheld terminal 200 is set at a sleep mode, the "passing communication" may be performed. The sleep mode is a power-saving mode, and is a state where a part of the functions of the handheld terminal 200 (for example, some of the functions of the CPU 231, some of the functions of the display, and the like) are stopped. For example, a state in which no application is being executed because operations of one or both of the core 231A and the core 231B are stopped is also a sleep mode. In the sleep mode, the core 231A is not powered. Therefore, only when passing information is written on the stored data memory 234 and is read from the stored data memory 234, the core 231A is powered to be booted. Then, the core 231A writes and reads passing information on and from the stored data memory 234. Other passing communication processes are performed by the wireless communication module 237 which is powered even in the sleep mode.

A microcomputer 238 is connected to the CPU 231. The microcomputer 238 includes a memory 238a and an RTC 238b. The memory 238a is structured as a RAM, for example. A program executed by the microcomputer 238 and data used for executing the program are read from the memory card 228, the cartridge 229, the stored data memory 234, and the like, and are stored in the memory 238a. The RTC 238b counts a time and outputs the time to the microcomputer 238. For example, the microcomputer 238 can calculate the date, a current time and the like based on the time counted by the RTC 238b. The power circuit 239 controls electric power from a power supply (typically, a battery accommodated in the lower housing 211) of the handheld terminal 200 to supply the electric power to each electronic component of the handheld terminal 200.

Further, an acceleration sensor 244 is connected to the microcomputer 238. The acceleration sensor 244 is a triaxial acceleration sensor, for example. The acceleration sensor 244 is provided within the lower housing 211, for example. Alternatively, the acceleration sensor 244 may be provided within the upper housing 221. The acceleration sensor 244 detects acceleration in two directions that are orthogonal to each other. One of the two directions is perpendicular to the surface of the lower LCD 212 (the upper LCD 222 in a case where the acceleration sensor 244 is provided within the upper housing 221) of the handheld terminal 200, and the other direction is in parallel to the surface of the lower LCD 212 (the upper LCD 222 in a case where the acceleration sensor 244 is provided within the upper housing 221). The acceleration sensor 244 outputs signals indicating the detected acceleration (acceleration signals) to the microcomputer 238. Based on the acceleration signals, the microcomputer 238 can detect the orientation of the handheld terminal 200 and the magnitude of vibration exerted on the handheld terminal 200.

The microcomputer 238 executes a number-of-steps measuring program stored in the memory 238a while the power is on, thereby performing a process of measuring the number of steps of the user (number-of-steps counting process) by use of the acceleration sensor 244. The microcomputer 238 instructs the core 231A to cause the stored data memory 234 to store number-of-steps data indicating the measured number of steps every predetermined time period. It should be noted that the microcomputer 238 is powered even in the sleep mode and performs the number-of-steps counting process, whereas the core 231A that is in a stopped state is powered to be booted, so as to store the number-of-steps data in the stored data memory 234. The number-of-steps counting process will be described in detail below with reference to FIG. 19.

The handheld terminal 200 includes the microphone 241 and an amplifier 242. The microphone 241 and the amplifier 242 are connected to the I/F circuit 240. The microphone 241 detects voice produced by the user toward the handheld terminal 200, and outputs a sound signal indicating the voice to the I/F circuit 240. The amplifier 242 amplifies the sound signal from the I/F circuit 240, and causes the speakers (not shown) to output the sound signal. The I/F circuit 240 is connected to the CPU 231.

The touch panel 213 is connected to the I/F circuit 240. The I/F circuit 240 includes a sound control circuit for controlling the microphone 241 and the amplifier 242 (the speakers), and a touch panel control circuit for controlling the touch panel 213. The sound control circuit performs A/D conversion or D/A conversion of the sound signal, and converts the sound signal into sound data in a predetermined format. The touch panel control circuit generates touch position data in a predetermined format based on a signal from the touch panel 213, and outputs the touch position data to the CPU 231. For example, the touch position data is data indicating coordinates of a position at which an input is performed on an input surface of the touch panel 213. The touch panel control circuit reads a signal from the touch panel 213 and generates touch position data every predetermined period of time. The CPU 231 is capable of recognizing a position at which an input is performed on the touch panel 213 by obtaining the touch position data via the I/F circuit 240.

An operation button 214 includes the above operation buttons 214A to 214K, and is connected to the CPU 231. The operation button 214 outputs operation data indicating an input state of each of the buttons 214A to 214K (whether or not each button is pressed) to the CPU 231. The CPU 231 obtains the operation data from the operation button 214, and performs processing in accordance with an input performed onto the operation button 214.

The inner camera 223 and the outer camera 225 are connected to the CPU 231. Each of the inner camera 223 and the outer camera 225 takes an image in accordance with an instruction from the CPU 231, and outputs data of the taken image to the CPU 231. In the exemplary embodiment, the CPU 231 gives an imaging instruction to the inner camera 223 or the outer camera 225, and the camera which has received the imaging instruction takes an image and transmits image data to the CPU 231.

The lower LCD 212 and the upper LCD 222 are connected to the CPU 231. Each of the lower LCD 212 and the upper LCD 222 displays an image thereon in accordance with an instruction from the CPU 231.

(Memory Map of the Handheld Terminal 200)

Figure 9:
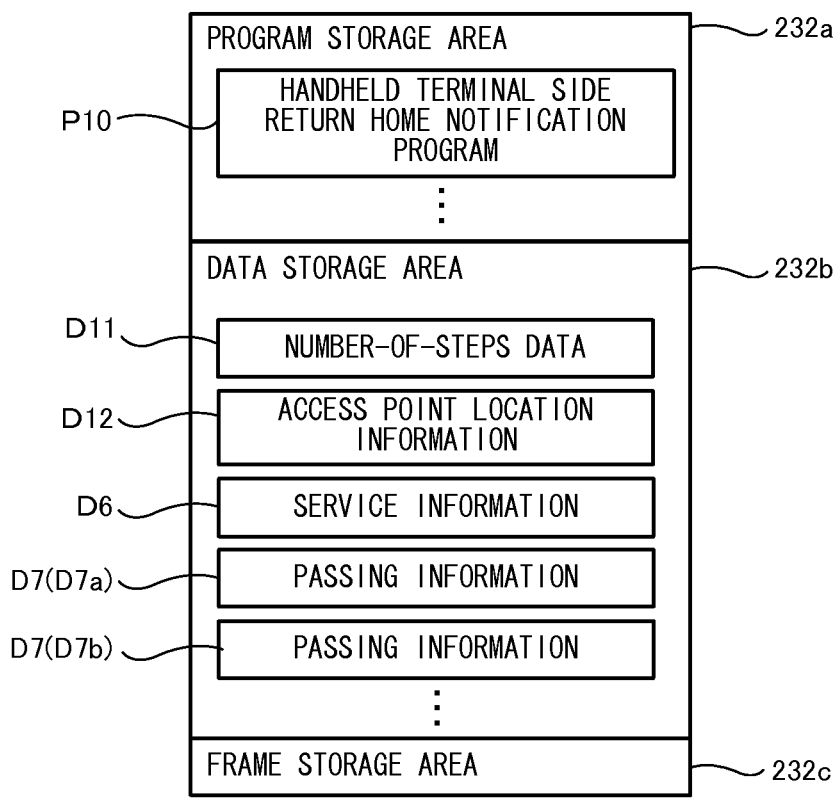
FIG. 9 is a memory map showing a non-limiting example of a program and data stored in a main memory.

Hereinafter, a program and data stored in the main memory 232 of the handheld terminal 200 will be described with reference to FIG. 9. FIG. 9 shows a memory map showing a non-limiting example of a program and data stored in the main memory 232. The main memory 232 includes a program storage area 232a, a data storage area 232b, and a frame storage area 232c. The handheld terminal side return home notification program P10 is stored in the program storage area 232a. The handheld terminal side return home notification program P10 is a program for causing the core 231A to perform (to cause the game apparatus 103 to perform) processes (the handheld terminal side return home notification process) of determining whether the user of the handheld terminal 200 has returned home or is at home and for announcing the user' returning home.

Further, the service information D6, the passing information D7 (D7a, D7b), number-of-steps data D11, and the access point location information D12 are stored in the data storage area 232b, by the core 231A executing the handheld terminal side return home notification program P10. The service information D6 is the same as the service information D6 shown in FIG. 6A and is the information received from the game apparatus 103. The passing information D7 is information of avatars of the handheld terminal 200 as described above, identification information for identifying the most immediately used application, and the like. The passing information D7a is the same as the passing information D7a shown in FIG. 6A and is the passing information received from other handheld terminals 200. The passing information D7b is the passing information D7 generated in the own apparatus and to be transmitted to another handheld terminal 200. In a case where the passing information D7a and the passing information D7b are not distinguished from each other, they are simply referred to as the passing information D7.

The number-of-steps data D11 is data indicating the number of steps of the user of the handheld terminal 200, and is data generated by the core 231A based on a number-of-steps count value measured by the microcomputer 238. The number-of-steps data D11 is transmitted to the game apparatus 103. The access point location information D12 is information indicating the location of the access point 2 received from the access point 2. The access point location information D12 is transmitted to the game apparatus 103 as the return home determination factor described above.

The frame storage area 232c is an area for temporally storing communication frames (frames D21 to D28 shown in FIG. 10B to FIG. 10G, FIG. 11B, and FIG. 12B) to be transmitted by the handheld terminal 200 to the game apparatus 103 or received by the handheld terminal 200 from the game apparatus 103. The communication frames will be described in detail below with reference to FIG. 10B to FIG. 10G, FIG. 11B, and FIG. 12B.

The handheld terminal side return home notification program P10, and the data D6, D7, D11, and D12 are read, for example, from the stored data memory 234 and is stored in the program storage area 232a and the data storage area 232b.

(Outline of the Return Home Notification Process)

Hereinafter, the outline of the return home notification process performed by the return home notification system 1 will be described with reference to FIG. 1, FIG. 3, FIG. 10A to FIG. 10G, FIG. 11A, FIG. 11B, FIG. 12A, and FIG. 12B. As shown in FIG. 1, the user of a handheld terminal 200 is in the use's own house. While the power is on, the handheld terminal 200 transmits a terminal beacon frame (see FIG. 10B) by broadcast at a predetermined cycle (every several seconds). When the user is at home as shown in FIG. 1, the game apparatus 103 can receive the terminal beacon frame since the game apparatus 103 is located within the radio wave coverage of the handheld terminal 200. Upon receiving the terminal beacon frame for the first time, the game apparatus 103 registers the handheld terminal 200 (handheld terminal 200 that is a user terminal) that transmitted this terminal beacon frame, as an at-home handheld terminal 200 in the at-home terminal table D2 (see FIG. 6C). As long as the game apparatus 103 is receiving the terminal beacon frames from this at-home handheld terminal 200, the game apparatus 103 determines that this handheld terminal 200 is at home.

With reference to FIG. 3, the user of the handheld terminal 200 is not at home and is out of the user's house. In this case, since the game apparatus 103 is not located within the radio wave coverage of the handheld terminal 200, the game apparatus 103 cannot receive the terminal beacon frames. When the game apparatus 103 has become unable to receive the terminal beacon frames any longer from the at-home handheld terminal 200 (a handheld terminal 200 registered in the at-home terminal table D2), there is a possibility that the handheld terminal 200 has gone out. Therefore, the game apparatus 103 registers this handheld terminal 200 in the communication-disabled terminal table D3 (see FIG. 6D).

Then, when the game apparatus 103 receives a terminal beacon frame again from the communication-disabled handheld terminal 200, the game apparatus 103 performs a process (at-time-of-communication-resumption process) including a process of determining (return home determination process) whether this handheld terminal 200 has returned home. In this return home determination process, it is determined whether the user of the handheld terminal 200 has returned home by use of the return home determination factor as described above (the number-of-steps data D11, the access point location information D12, and elapsed time information).

Figure 10A:
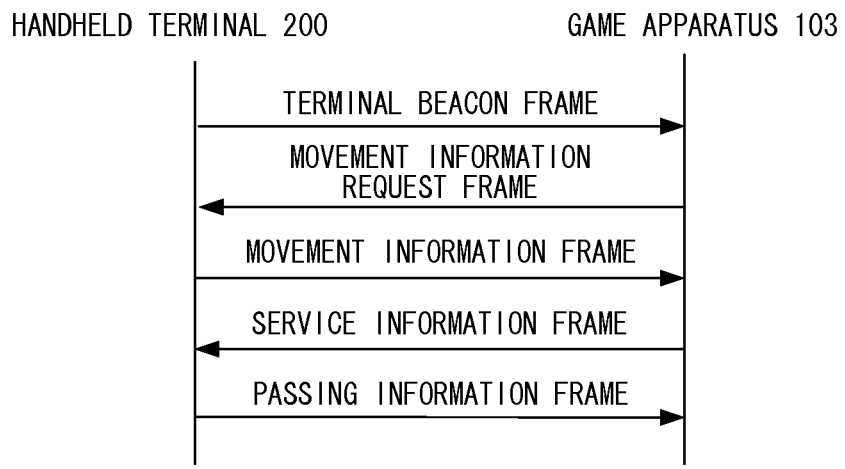
FIG. 10A is a communication sequence diagram showing a non-limiting example of communication performed between a game apparatus and a handheld terminal in an at-time-of-communication-resumption process.
Figure 10B:
FIG. 10B shows a non-limiting example of a terminal beacon frame.

Hereinafter, with reference to FIG. 10A to FIG. 10G, communication performed between the game apparatus 103 and the handheld terminal 200 in the at-time-of-communication-resumption process will be described. FIG. 10A is a communication sequence diagram showing a non-limiting example of communication performed between the game apparatus 103 and the handheld terminal 200 in the at-time-of-communication-resumption process. The game apparatus 103 receives a terminal beacon frame from the communication-disabled handheld terminal 200. FIG. 10B shows a non-limiting example of the terminal beacon frame. A terminal beacon frame D21 includes a frame type F_TYP, a destination MAC address (broadcast address), a source MAC address, and the number-of-steps data D11. In the frame type F_TYP, the type of the frame is described. The number-of-steps data D11 shows the number of steps of the user of the handheld terminal 200 as described with reference to FIG. 9.

Figure 10C:
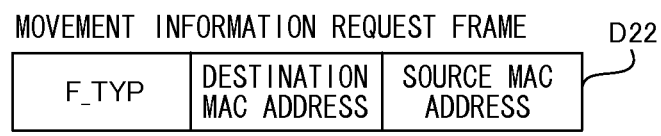
FIG. 10C shows a non-limiting example of a movement information request frame.

With reference back to FIG. 10A, upon receiving the terminal beacon frame D21 from the communication-disabled handheld terminal 200, the game apparatus 103 performs the at-time-of-communication-resumption process as described above. In this at-time-of-communication-resumption process, the game apparatus 103 performs a connection establishment process (including transmission of a communication request to the handheld terminal 200) for establishing connection with the communication-disabled handheld terminal 200, and when the connection has been established, the game apparatus 103 transmits a movement information request frame to the handheld terminal 200. FIG. 10C shows a non-limiting example of the movement information request frame. A movement information request frame D22 includes a frame type F_TYP, a destination MAC address, and a source MAC address.

Figure 10D:
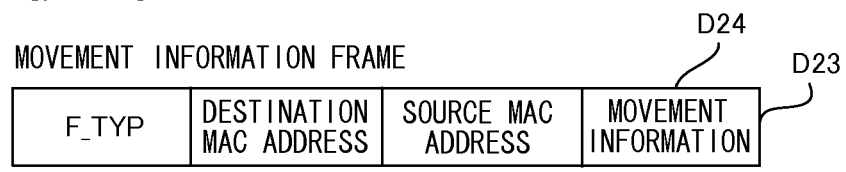
FIG. 10D shows a non-limiting example of a movement information frame.
Figure 10E:
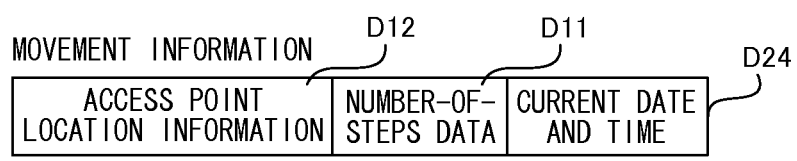
FIG. 10E shows a non-limiting example of movement information.

With reference back to FIG. 10A, in response to the communication request from the game apparatus 103, the handheld terminal 200 performs a connection establishment process for establishing connection with the game apparatus 103. Upon receiving the movement information request frame D22 after the connection with the game apparatus 103 has been established, the handheld terminal 200 transmits a movement information frame to the game apparatus 103. FIG. 10D shows a non-limiting example of the movement information frame. A movement information frame D23 includes a frame type F_TYP, a destination MAC address, a source MAC address, and movement information D24. FIG. 10E shows a non-limiting example of the movement information D24. The movement information D24 is information indicating the return home determination factor, and indicates the access point location information D12, the number-of-steps data D11, and the current date and time. The current date and time indicates the date and time at which the handheld terminal 200 generated the movement information.

Figure 10F:
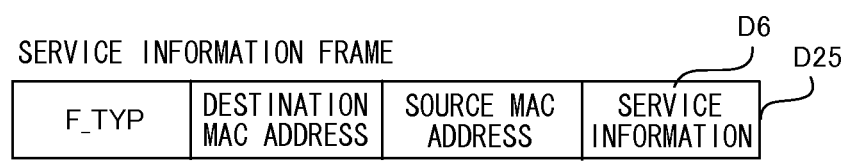
FIG. 10F shows a non-limiting example of a service information frame.

With reference back to FIG. 10A, the game apparatus 103 can obtain the return home determination factor by receiving a location information frame D23. That is, the game apparatus 103 obtains the movement information D24 indicating the return home determination factor from the location information frame D23, and performs the return home determination process for determining whether the user of the handheld terminal 200 has returned home, by use of this movement information D24. Then, upon determining that the user of the handheld terminal 200 has returned home, the game apparatus 103 performs a process of announcing to another user the returning home of the user as shown in FIG. 2. At the same time, the game apparatus 103 transmits a service information frame to the handheld terminal 200. FIG. 10F shows a non-limiting example of the service information frame. A service information frame D25 includes a frame type F_TYP, a destination MAC address, a source MAC address, and the service information D6. The service information D6 is the information that the game apparatus 103 has received from the server 4, as described above.

Figure 10G:
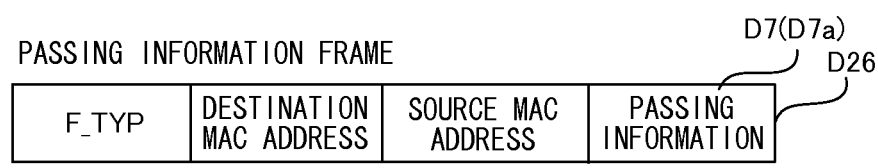
FIG. 10G shows a non-limiting example of a passing information frame.

With reference back to FIG. 10A, by receiving the service information frame D25, the handheld terminal 200 can obtain the service information D6 obtained by the game apparatus 103 while the handheld terminal 200 was not at home. Then, upon receiving the service information frame D25, the handheld terminal 200 transmits a passing information frame D26 to the game apparatus 103 so as to allow the game apparatus 103 to obtain the passing information D7 (D7a) that the handheld terminal 200 has obtained while being out. FIG. 10G shows a non-limiting example of the passing information frame D26. The passing information frame D26 includes a frame type F_TYP, a destination MAC address, a source MAC address, and the passing information D7 (D7a). The passing information D7 is the information that the handheld terminal 200 has obtained by performing passing communication with other handheld terminals 200 as described above. In FIG. 10G, the passing information frame D26 includes only one piece of passing information D7 (D7a). However, when the handheld terminal 200 has obtained the passing information D7 (D7a) by performing passing communication with a plurality of handheld terminals 200, the passing information frame D26 includes a plurality of pieces of the passing information D7 (D7a).

With reference back to FIG. 10A, the game apparatus 103 can obtain the passing information D7 (D7a) by receiving the passing information frame D26. The passing information D7 (D7a) is displayed on the screen of the television 102 and is transmitted to the server 4.

Figure 11A:
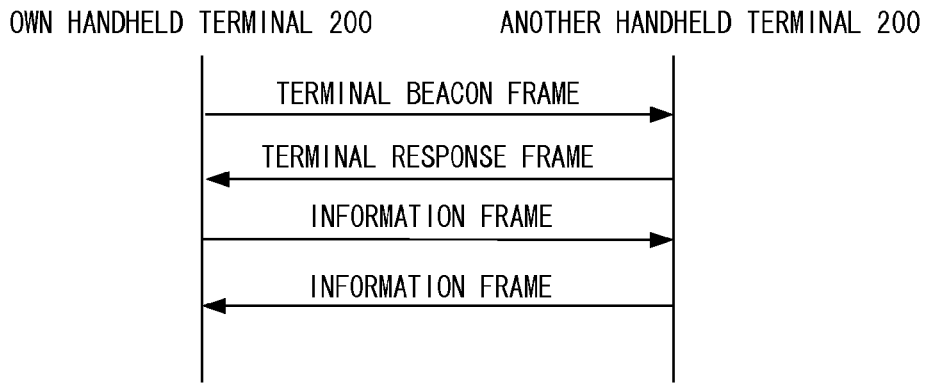
FIG. 11A shows a non-limiting example of passing communication.
Figure 11B:
FIG. 11B shows a non-limiting example of an information frame.

Next, with reference to FIG. 3, FIG. 11A, and FIG. 11B, the passing communication which a handheld terminal 200 performs with another handheld terminal 200 will be described. With reference to FIG. 3, the handheld terminal 200 receives passing information D7 (D7a) through passing communication with another handheld terminal 200, and transmits passing information D7 (D7b) generated in itself to the other handheld terminal 200. FIG. 11A shows a non-limiting example of the passing communication.

The handheld terminal 200 transmits a terminal beacon frame D21 (see FIG. 10B) by broadcast as described above. Another handheld terminal 200 that has received this terminal beacon frame D21 returns a terminal response frame. Since the frame configuration of the terminal response frame is similar to that of the movement information request frame D22 shown with reference to FIG. 10C, except that the terminal response frame is described as the frame type F_TYP, the description of the terminal response frame will be omitted. Upon receiving the terminal response frame, the handheld terminal 200 transmits an information frame to the other handheld terminal 200. FIG. 11B shows a non-limiting example of the information frame. An information frame D27 includes a frame type F_TYP, a destination MAC address, a source MAC address, and the passing information D7. The passing information D7 included here is the passing information D7b generated in the own apparatus. Accordingly, the handheld terminal 200 can allow the other handheld terminal 200 to obtain its own passing information D7b.

With reference back to FIG. 11A, upon receiving the information frame D27, the other handheld terminal 200 transmits to the handheld terminal 200 an information frame D27 containing the passing information D7 (D7a) generated in the other handheld terminal 200. The handheld terminal 200 receives the information frame D27 from the other handheld terminal 200. Thus, the handheld terminal 200 can obtain the passing information D7 (D7a) from the other handheld terminal 200. In this manner, the handheld terminal 200 can transmit and receive passing information D7 to and from the other handheld terminal 200. It should be noted that although, in FIG. 11A, the handheld terminal 200 is the one that transmits a terminal beacon frame D21 to the other handheld terminal 200, if the handheld terminal 200 is the one that receives a terminal beacon frame D21 from the other handheld terminal 200, the contents of the frames transmitted and received are reversed to those in FIG. 11A.

Figure 12A:
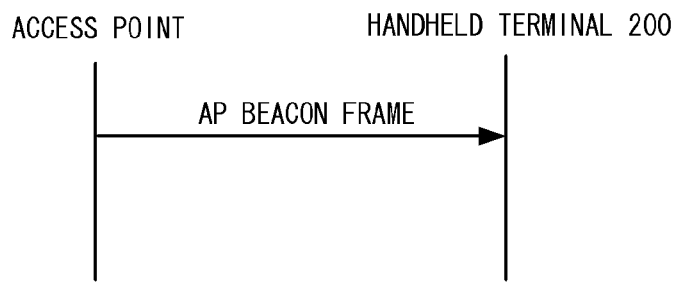
FIG. 12A is a communication sequence diagram showing a non-limiting example of communication between an access point and a handheld terminal.
Figure 12B:
FIG. 12B shows a non-limiting example of an AP beacon frame.

Next, with reference to FIG. 3, FIG. 12A and FIG. 12B, communication in which the handheld terminal 200 obtains the access point location information D12 from the access point 2 will be described. With reference to FIG. 3, the handheld terminal 200 is located within the radio wave coverage (for example, 50 m to 100 m) of the access point 2. FIG. 12A is a communication sequence diagram showing a non-limiting example of communication between the access point 2 and the handheld terminal 200. The access point 2 transmits an AP beacon frame at a predetermined cycle (for example, every several seconds) by broadcast. FIG. 12B shows a non-limiting example of an AP beacon frame D28.

The AP beacon frame D28 includes a frame type F_TYP, a BSS ID (Basic Service Set ID), an ESS ID (Extended Service ID), security information, an RSSI (Received Signal Strength Indication), channel information, the access point location information D12, and the like. The BSS ID is unique identification information for identifying the access point 2. The ESS ID is unique identification information for identifying the network, and in this case, identification information unique to the wireless LAN composed of the access point 2 and the handheld terminal 200 is described therein. The security information is information for ensuring the security of communication between the access point 2 and the handheld terminal 200. The RSSI is information with which the handheld terminal 200 measures the strength of signals. The channel information is information indicating the channel used in the communication between the access point 2 and the handheld terminal 200. The access point location information D12 is information indicating the location at which the access point 2 is set as described above.

Although the AP beacon frame D28 includes the access point location information D12 in the exemplary embodiment, the AP beacon frame D28 may not include the access point location information D12. For example, a configuration may be employed in which the handheld terminal 200 stores a table in which the BSS ID of the access point 2 and the access point location information D12 are registered, associated with each other, and by searching this table by use of the BSS ID contained in the AP beacon frame D28, the access point location information D12 is obtained.

As described above, by receiving the AP beacon frame D28, the handheld terminal 200 can obtain the access point location information D12 to be used as the return home determination factor.

(Detailed Description of the Stationary Apparatus Side Return Home Notification Process)

Figure 13:
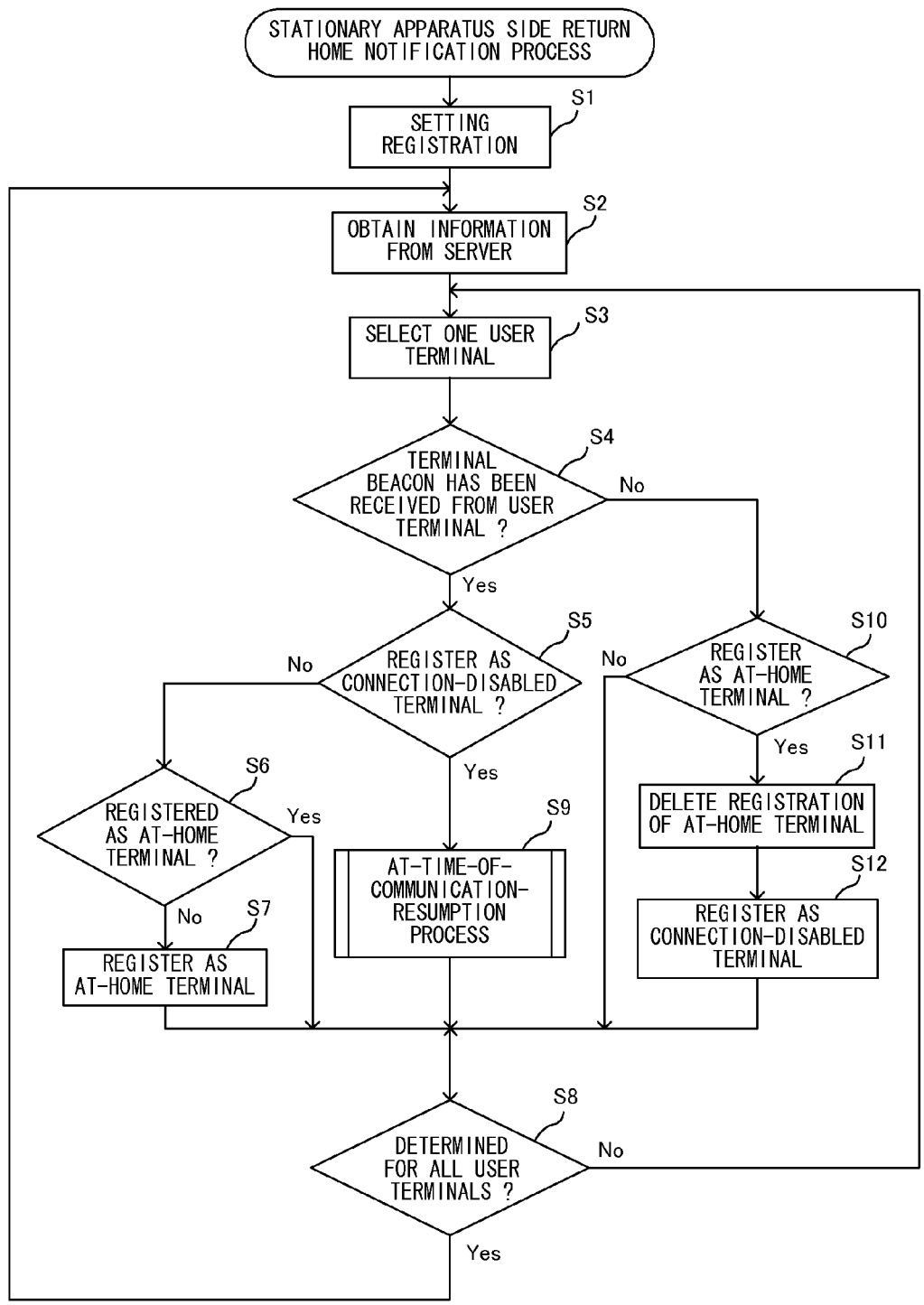
FIG. 13 is a flowchart showing a non-limiting example of a stationary apparatus side return home notification process performed by a CPU of a game apparatus.

Hereinafter, with reference to FIG. 13, the stationary apparatus side return home notification process performed by the game apparatus 103 will be described. FIG. 13 is a flowchart showing a non-limiting example of the stationary apparatus side return home notification process performed by the CPU 110 of the game apparatus 103. The stationary apparatus side return home notification process is performed by the CPU 110, upon execution of the stationary apparatus side return home notification program P1 (see FIG. 6A), and is started, for example, when the game apparatus 103 is powered on.

The CPU 110 performs a setting registration process for a handheld terminal 200 used as a user terminal (S1). The setting registration process is a process for registering the handheld terminal 200 as a user terminal in the user terminal table D1 (see FIG. 6A and FIG. 6B). In the flowchart shown in FIG. 13, the process of step S1 is performed at the beginning. The process of step S1 is performed only when the user instructs the performance of the setting registration process.

Then, the CPU 110 performs processes from step S2 to S12 at a predetermined cycle (for example, every several seconds). Hereinafter, the processes step S2 to step S12 will be described. The CPU 110 downloads the service information D6 from the server 4 (see FIG. 3) and performs a process for causing the service information D6 to be stored in the flash memory 117 (S2). Then, the CPU 110 selects a handheld terminal 200 from handheld terminals 200 registered in the user terminal table D1 (S3). The CPU 110 determines whether a terminal beacon frame D21 (see FIG. 10B) has been received from the handheld terminal 200 selected in step S3 (S4).

When determining that the terminal beacon frame D21 has been received from the selected handheld terminal 200 (YES in S4), the CPU 110 determines whether information of the selected handheld terminal 200 is registered in the communication-disabled terminal table D3 (see FIG. 6A and FIG. 6D) (S5). When determining that the information of the selected handheld terminal 200 is not registered in the communication-disabled terminal table D3 (NO in S5), the CPU 110 determines whether information of the handheld terminal 200 is registered in the at-home terminal table D2 (see FIG. 6A and FIG. 6C) (S6). Here, when determining that the information of the selected handheld terminal 200 is not registered in the at-home terminal table D2 (NO in S6), the CPU 110 registers the number of steps indicated by the number-of-steps data D11 contained in the terminal beacon frame D21 and the terminal ID of the selected handheld terminal 200 in the at-home terminal table D2 (S7), and advances the process to step S8. When determining that the information of the selected handheld terminal 200 is registered in the at-home terminal table D2 (YES in S6), the CPU 110 advances the process to step S8 without performing step S7.

In step S8, the CPU 110 determines whether the process of step S4 has been performed for all of the handheld terminals 200 registered in the user terminal table D1. If there are handheld terminals 200 for which the process of step S4 has not been performed (NO in S8), the CPU 110 returns the process to step S3, and selects a handheld terminal 200 that is a user terminal from the handheld terminals 200 that have not been selected. Then, the CPU 110 performs subsequent processes and the process is repeatedly returned to step S3 until it is determined that the process of step S4 has been performed for all of the handheld terminals 200 registered in the user terminal table D1 (until it is determined as YES in S8).

On the other hand, when determining that the process of step S4 has been performed for all of the handheld terminals 200 registered in the user terminal table D1 (YES in S8), the CPU 110 returns the process to step S2. It should be noted that the CPU 110 performs the process of step S2 after the predetermined cycle has elapsed since the CPU 110 performed the process of step S2 last time.

Next, a process performed when it is determined as YES in step S5 will be described. When determining that the selected handheld terminal 200 is registered in the communication-disabled terminal table D3 (see FIG. 6A and FIG. 6D) in step S3 (YES in S5), the CPU 110 performs the at-time-of-communication-resumption process (S9). The at-time-of-communication-resumption process includes not only the return home determination process for determining whether the user of the handheld terminal 200 has returned home, but also a process of transmitting and receiving information to and from the handheld terminal 200 when it is determined that the user has returned home, and the like. The at-time-of-communication-resumption process will be described in detail below with reference to FIG. 14. Then, the CPU 110 performs the process of step S8 described above and determines whether the process of step S4 has been performed for all of the handheld terminals 200 registered in the user terminal table D1. When the determination result in step S8 is affirmative, the CPU 110 returns the process to step S2, and when the determination result in step S8 is negative, the CPU 110 returns the process to step S3.

Next, the process performed when it is determined as NO in step S4 will be described. When determining that the terminal beacon frame D21 has not been received from the selected handheld terminal 200 (see FIG. 10B) (NO in S4), the CPU 110 determines whether information of the handheld terminal 200 is registered in the at-home terminal table D2 (S10). When determining that the information of the selected handheld terminal 200 is registered in the at-home terminal table D2 (YES in S10), the CPU 110 deletes the information (terminal ID and number of steps) of the selected handheld terminal 200 registered in the at-home terminal table D2 (S11), and registers the deleted information and the current date and time, associated with each other, in the communication-disabled terminal table D3 (S12).

Thereafter, the CPU 110 performs the process of step S8, and determines whether the process of step S4 has been performed for all the handheld terminals 200 registered in the user terminal table D1. When the determination result in step S8 is affirmative, the CPU 110 returns the process to step S2, and when the determination result in step S8 is negative, the CPU 110 returns the process to step S3. When determining that the information of the selected handheld terminal 200 is not registered in the at-home terminal table D2 (NO in S10), the CPU 110 does not perform step S11 and step S12 and performs step S8.

Figure 14:
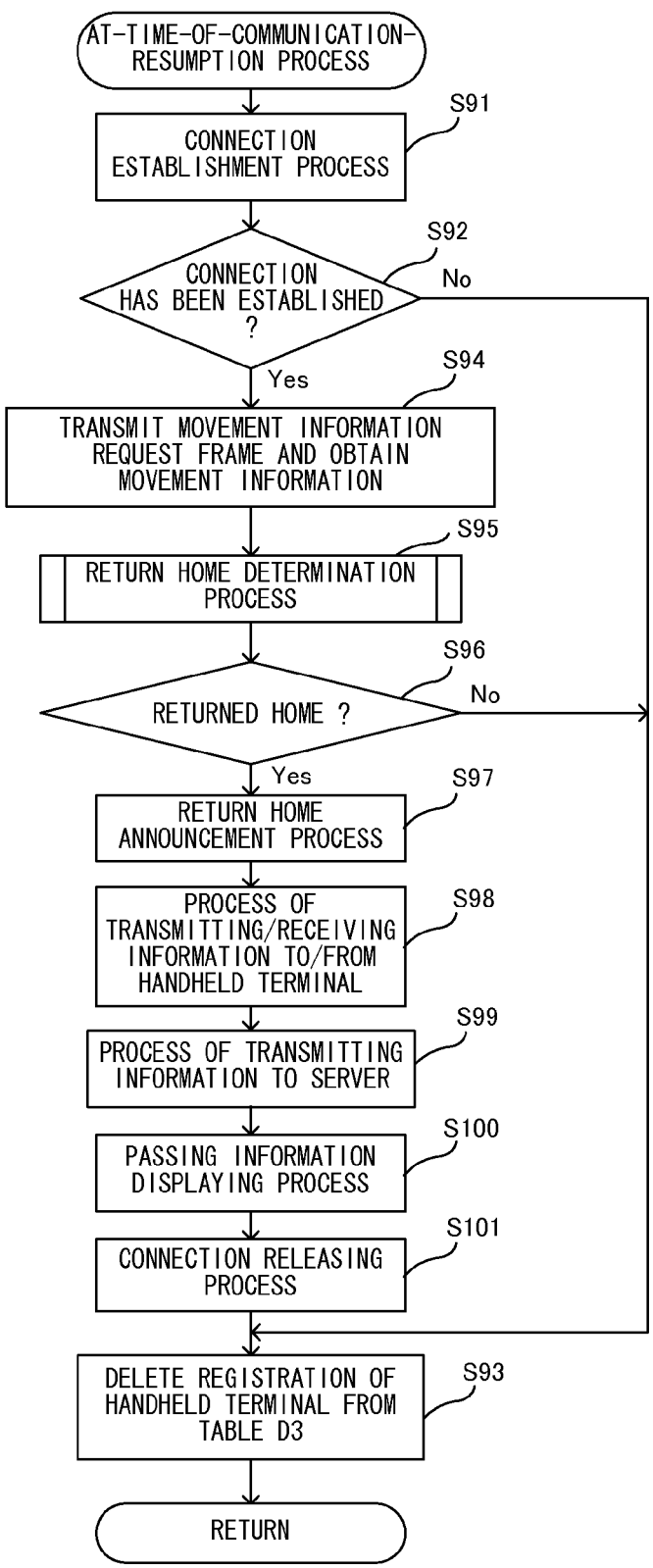
FIG. 14 is a flowchart showing a non-limiting example of an at-time-of-communication-resumption process.

Next, the at-time-of-communication-resumption process performed in step S9 will be described with reference to FIG. 14. FIG. 14 is a flowchart showing a non-limiting example of the at-time-of-communication-resumption process. First, the CPU 110 performs the connection establishment process (including a process of transmitting communication request) for establishing connection with the selected handheld terminal 200 (S91). Then, the CPU 110 determines whether connection with the selected handheld terminal 200 has been established (S92).

When determining that the connection with the selected handheld terminal 200 has not been established (NO in S92), the CPU 110 deletes the information of the selected handheld terminal 200 from the communication-disabled terminal table D3 (S93), ends the at-time-of-communication-resumption process, and performs step S8 in FIG. 13. On the other hand, when determining that the connection with the selected handheld terminal 200 has been established (YES in S92), the CPU 110 transmits a movement information request frame D22 (see FIG. 10C) to the selected handheld terminal 200, and then receives a movement information frame D23 (see FIG. 10D) from the handheld terminal 200 that has received that frame D22, and obtains movement information D24 (see FIG. 10E) from this frame D23 (S94).

Then, the CPU 110 performs the return home determination process by using the movement information D24 (S95). The return home determination process will be described in detail below with reference to FIG. 15. Through this return home determination process, it is determined whether the user of the selected handheld terminal 200 has returned home or has been at home. Then, based on this determination result, the CPU 110 determines whether the user of the selected handheld terminal 200 has returned home (S96). Here, if it is determined that it is not the case where the user of the selected handheld terminal 200 has returned home (that is, the user has been at home) (NO in S96), the CPU 110 deletes the information of the selected handheld terminal 200 from the communication-disabled terminal table D3 (S93), and then ends the at-time-of-communication-resumption process and performs step S8 in FIG. 13. On the other hand, when determining that the user of the selected handheld terminal 200 has returned home (YES in S96), the CPU 110 performs a process for announcing that the returning home of the user of the selected handheld terminal 200 (for example, a process for displaying the screen as shown in FIG. 2) (S97).

Thereafter, the CPU 110 performs a process (a process of transmitting and receiving information to and from the handheld terminal 200) for transmitting and receiving information to and from the selected handheld terminal 200 (S98). Specifically, the CPU 110 transmits a service information frame D25 (see FIG. 10F) to the selected handheld terminal 200, and receives a passing information frame D26 (see FIG. 10G) from this handheld terminal 200. The CPU 110 obtains passing information D7 (D7a) from the received passing information frame D26. It should be noted that, when the selected handheld terminal 200 has failed to obtain passing information D7 (D7a) from another handheld terminal 200, a NULL value is contained as the passing information D7 (D7a) in the passing information frame D26.

Then, the CPU 110 performs a process (a process of transmitting information to the server 4) of transmitting the obtained passing information D7 to the server 4 (S99). Then, the CPU 110 performs a process (passing information displaying process) for displaying the passing information D7 on the screen of the television 102 after or at the same time of announcing the returning home of the user (S100). It should be noted that if the obtained passing information D7 indicates a NULL value, the CPU 110 performs a process for displaying that the passing information D7 has not been obtained. Then, the CPU 110 performs a process of releasing the connection with the selected handheld terminal 200 (S101), and then deletes the information of the selected handheld terminal 200 from the communication-disabled terminal table D3 (S93). Thereafter, the CPU 110 ends the at-time-of-communication-resumption process and performs step S8 in FIG. 13.

Figure 15:
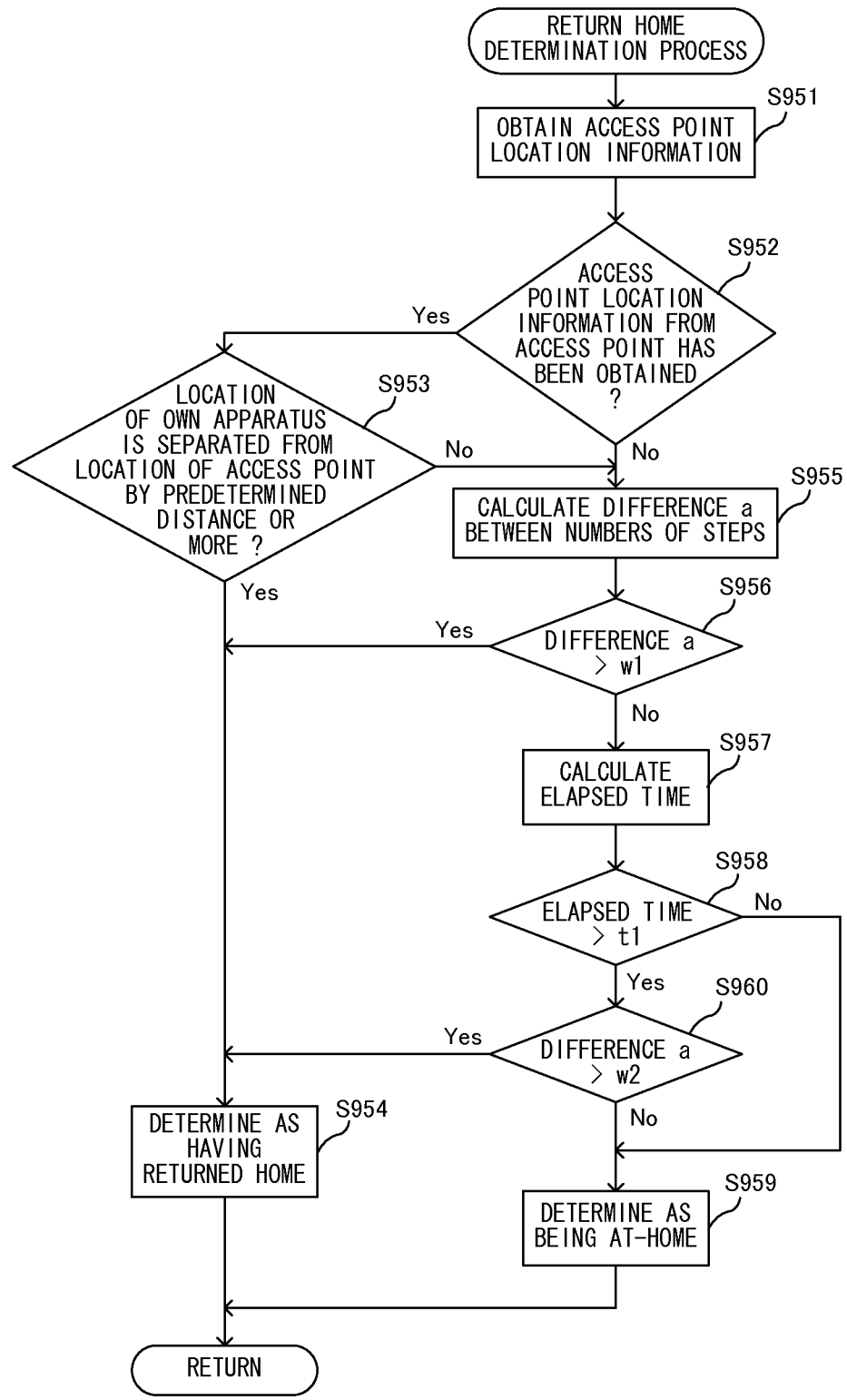
FIG. 15 is a flowchart showing a non-limiting example of a return home determination process.

Hereinafter, the return home determination process in step S95 will be described with reference to FIG. 15. FIG. 15 is a flowchart showing a non-limiting example of the return home determination process. First, the CPU 110 obtains access point location information D12 from the movement information D24 (S951). In a case where the handheld terminal 200 has failed to obtain the access point location information D12 from the access point 2 (a case where an AP beacon frame D28 (see FIG. 12B) has not been received from the access point 2), a NULL value is contained in the movement information frame D23 as the access point location information D12.

The CPU 110 determines whether the access point location information D12 is a NULL value, that is, whether the access point location information D12 from the access point 2 has been obtained (S952). When determining that the access point location information D12 from the access point 2 has been obtained (YES in S952), the CPU 110 determines whether the location of the own apparatus indicated by the own apparatus location information D5 (see FIG. 6A) and the location indicated by the access point location information D12 is separated by a predetermined distance or more (S953). Here, when determining that the location of the own apparatus and the location indicated by the access point location information D12 is separated by the predetermined distance or more (YES in S953), the CPU 110 determines that the user of the selected handheld terminal 200 has returned home (S954), ends the return home determination process, and advances the process to step S96 shown in FIG. 14. On the other hand, when determining that the location of the own apparatus and the location indicated by the access point location information D12 is not separated by the predetermined distance or more (NO in S953), the CPU 110 advances the process to step S955.

Next, the process performed by the CPU 110 when it is determined as NO in S952 will be described. When determining that the access point location information D12 from the access point 2 has not been obtained (NO in S952), the CPU 110 obtains the number of steps corresponding to the selected handheld terminal 200 from the communication-disabled terminal table D3. In addition, the CPU 110 obtains number-of-steps data D11 from the movement information D24 obtained in step S94. Then, the CPU 110 calculates a difference a between the number of steps indicated by the number-of-steps data D11 obtained from the movement information D24 and the number of steps obtained from the communication-disabled terminal table D3 (S955).

Next, the CPU 110 determines whether the difference a between the numbers of steps is greater than the threshold value w1 (S956). When determining that the difference a between the numbers of steps is greater than the threshold value w1 (YES in S956), the CPU 110 determines that the user of the selected handheld terminal 200 has returned home (S954), ends the return home determination process, and advances the process to step S96 shown in FIG. 14. On the other hand, when determining that the difference a between the numbers of steps is less than or equal to the threshold value w1 (NO in S956), the CPU 110 obtains the date and time (date and time at which communication became disabled) corresponding to the selected handheld terminal 200 from the communication-disabled terminal table D3. In addition, the CPU 110 obtains the current date and time from the movement information D24 obtained in step S94. Then, based on the current date and time obtained from movement information D24 and the date and time obtained from the communication-disabled terminal table D3, the CPU 110 calculates an elapsed time from the date and time obtained from the communication-disabled terminal table D3 to the current date and time (S957).

Then, the CPU 110 determines whether the calculated elapsed time is greater than a threshold value t1 (S958). Here, when determining that the calculated elapsed time is less than or equal to the threshold value t1 (NO in S958), the CPU 110 determines that the user of the selected handheld terminal 200 has been at home (was not out, that is, not "returning home") (S959), ends the return home determination process, and advances the process to step S96 shown in FIG. 14. On the other hand, when determining that the calculated elapsed time is greater than the threshold value t1 (YES in S958), the CPU 110 determines whether the difference a between the numbers of steps calculated in step S955 is greater than the threshold value w2 (S960).

Then, when determining that the difference a between the numbers of steps is greater than the threshold value w2 (YES in S960), the CPU 110 determines that the user of the selected handheld terminal 200 has returned home (S954), ends the return home determination process, and advances the process to step S96 shown in FIG. 14. On the other hand, when determining that the difference a between the numbers of steps is less than or equal to the threshold value w2 (NO in S960), the CPU 110 determines that the user of the selected handheld terminal 200 has been at home (S959), ends the return home determination process, and advances the process to step S96 shown in FIG. 14. Alternatively, the following configuration may be employed in which: it is determined that the user has been at home in the case of NO in S956; the process is advanced to S957 in the case of YES in S956; and it is determined that the use has returned home only in the case of YES both in S956 and S958. In this manner, it is possible to eliminate the case where the user intentionally increases the number of steps, for example, by shaking the handheld terminal 200.

(Detailed Description of the Handheld Terminal Side Return Home Notification Process)

Figure 16:
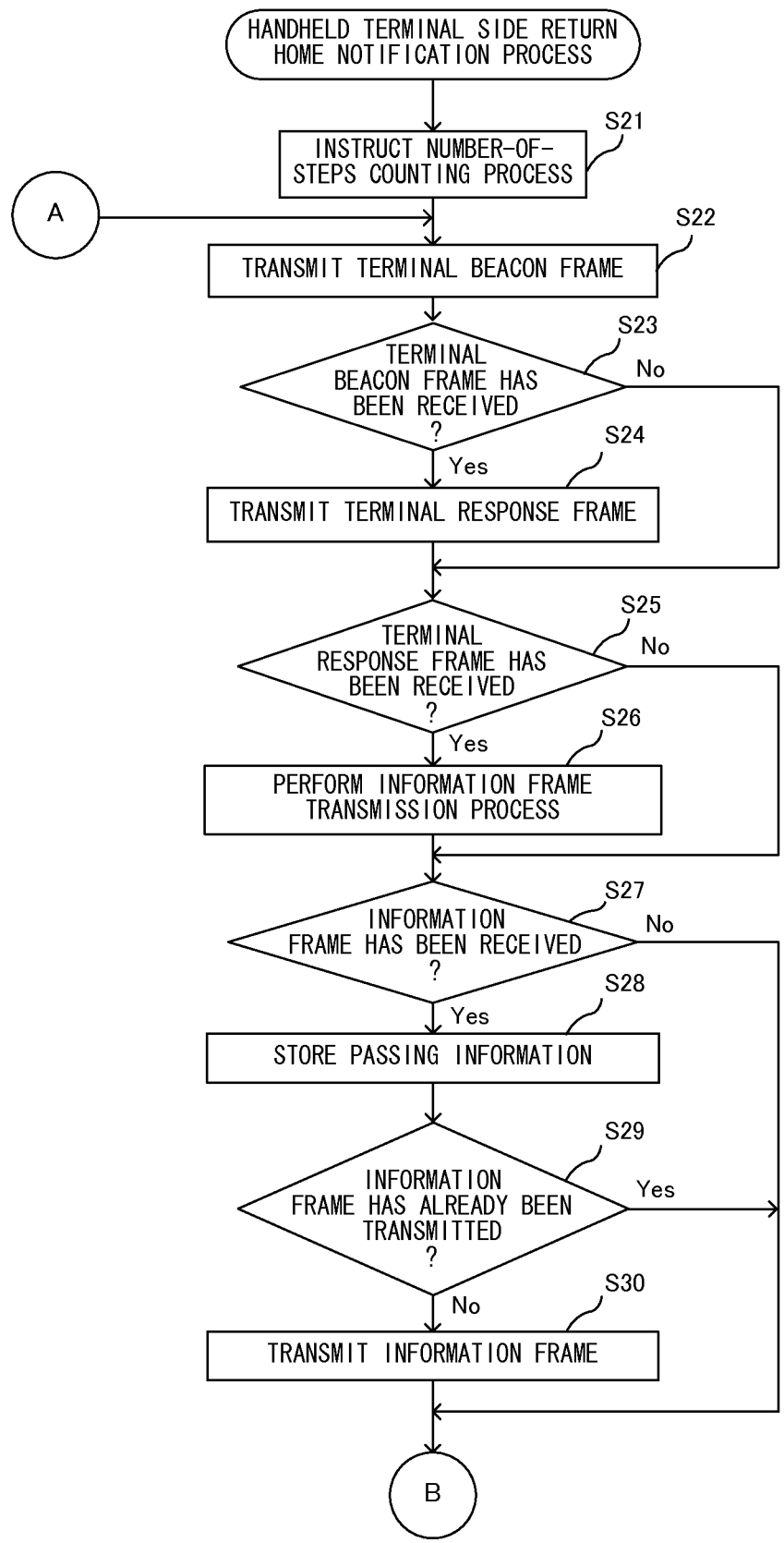
FIG. 16 is a flowchart (No. 1) showing a non-limiting example of a handheld terminal side return home notification process.
Figure 17:
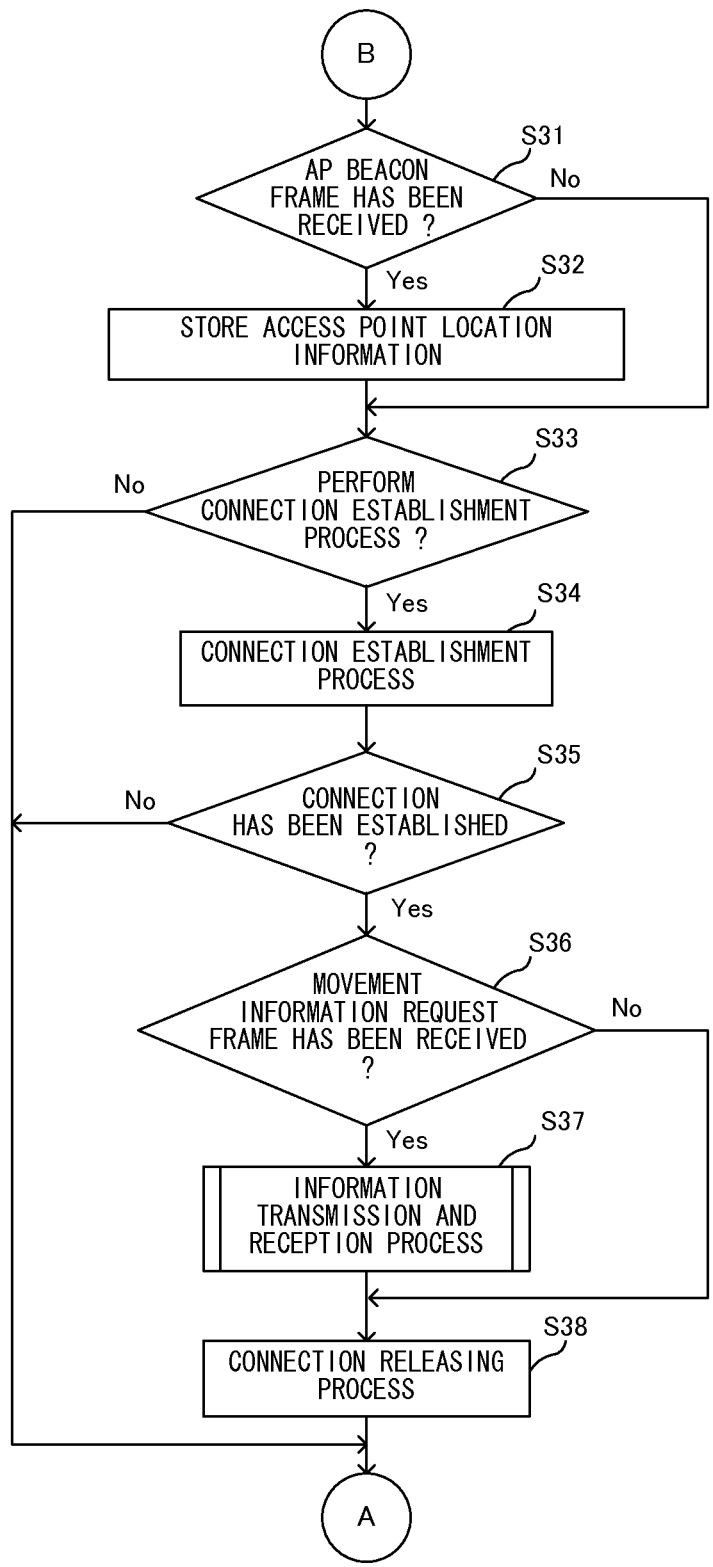
FIG. 17 is a flowchart (No. 2) showing a non-limiting example of a handheld terminal side return home notification process.

Hereinafter, the handheld terminal side return home notification process performed by the handheld terminal 200 will be described with reference to FIG. 16 and FIG. 17. FIG. 16 is a flowchart (No. 1) showing a non-limiting example of the handheld terminal side return home notification process. FIG. 17 is a flowchart (No. 2) showing a non-limiting example of the handheld terminal side return home notification process. First, with reference to FIG. 16, the handheld terminal side return home notification process is started when the handheld terminal 200 is powered on, and is performed by the core 231A while the power of the handheld terminal 200 is on. It should be noted that the core 231A performs the handheld terminal side return home notification process by use of the wireless communication module 237 and the microcomputer 238, by executing the handheld terminal side return home notification program P10 (see FIG. 9).

First, the core 231A instructs the microcomputer 238 to perform the number-of-steps counting process (S21). In the number-of-steps counting process, a process of counting the number of steps of the user is performed by use of the acceleration sensor 244. The number-of-steps counting process will be described in detail below with reference to FIG. 19. Next, the core 231A performs a process of transmitting a terminal beacon frame D21 (see FIG. 10B) by broadcast (S22). Then, the core 231A determines whether a terminal beacon frame D21 has been received from another handheld terminal 200 (S23). Here, when determining that a terminal beacon frame D21 has been received from another handheld terminal 200 (YES in S23), the core 231A transmits a terminal response frame (see FIG. 11A) to the other handheld terminal 200 (S24), and then advances the process to step S25. On the other hand, when determining that a terminal beacon frame D21 has not been received from another handheld terminal 200 (NO in S23), the core 231A does not perform step S24 and advances the process to step S25.

In step S25, the core 231A determines whether the terminal response frame (see FIG. 11A) has been received. When determining that the terminal response frame has been received (YES in S25), the core 231A performs a process (information frame transmitting process) of transmitting an information frame D27 (see FIG. 11A and FIG. 11B) to the handheld terminal 200 that is a corresponding partner (S26). Then, the core 231A advances the process to step S27. On the other hand, when determining that the terminal response frame has not been received from the other handheld terminal 200 (NO in S25), the core 231A does not perform step S26 and advances the process to step S27.

In step S27, the core 231A determines whether the information frame D27 has been received. When determining that the information frame D27 has been received (YES in S27), the core 231A obtains passing information D7 (D7a) from the information frame D27 and causes the passing information D7 (D7a) to be stored in the stored data memory 234 (S28). Then, the core 231A determines whether an information frame D27 has already been transmitted to the source of the information frame D27 received in step S27 (S29). When determining that an information frame D27 has not been transmitted to the source of the information frame D27 (NO in S29), the core 231A transmits an information frame D27 generated in the own apparatus to the source of the information frame D27 (S30). Thereby, passing information D7 can be transmitted and received between the other handheld terminal 200 and the own apparatus. Then, the core 231A advances the process to step S31. On the other hand, when determining that an information frame D27 has already been transmitted to the source of the information frame D27 (YES in S29), the core 231A does not perform step S30 and advances the process to step S31 shown in FIG. 17.

When it is determined as NO in step S27, that is, it is determined that the information frame D27 has not been received (NO in S27), the core 231A does not perform step S28 to step S30 and advances the process to step S31 shown in FIG. 17.

With reference to FIG. 17, in step S31, the core 231A determines whether an AP beacon frame D28 (see FIG. 12A and FIG. 12B) has been received. When determining that an AP beacon frame D28 (see FIG. 12A and FIG. 12B) has been received (YES in S31), the core 231A obtains access point location information D12 from the AP beacon frame D28 and causes the access point location information D12 to be stored in the stored data memory 234 (S32). Then, the core 231A advances the process to step S33. On the other hand, when determining that an AP beacon frame D28 has not been received (NO in S31), the core 231A does not perform step S32 and advances the process to step S33.

In step S33, the core 231A determines whether it is needed to perform the connection establishment process with the game apparatus 103 (whether a communication request has been received). When determining that it is not needed to perform the connection establishment process with the game apparatus 103 (NO in S33), the core 231A returns the process to step S22. On the other hand, when determining that it is needed to perform the connection establishment process with the game apparatus 103 (YES in S33), the core 231A performs the connection establishment process for establishing connection with the game apparatus 103 (S34). Then, the core 231A determines whether connection has been established (S35), and when determining that connection has not been established (NO in S35), the core 231A returns the process to step S22. On the other hand, when determining that connection has been established (YES in S35), the core 231A determines whether the movement information request frame D22 (see FIG. 10A and FIG. 10C) has been received from the game apparatus 103 (S36).

When determining that the movement information request frame D22 has been received (YES in S36), the core 231A performs a process (information transmission and reception process) for transmitting and receiving information with the game apparatus 103 (S37). The information transmission and reception process will be described in detail below with reference to FIG. 18. Then, after performing a process of releasing the connection with the game apparatus 103 (S38), the core 231A returns the process to step S22. It should be noted that the processes from step S22 to S38 are repeated at predetermined cycles (for example, every several seconds) while the handheld terminal 200 is powered. Therefore, when the predetermined time period has elapsed since the process of step S22 was performed last time, the step S22 is performed again. On the other hand, when determining that the movement information request frame D22 has not been received (NO in S36), the core 231A does not perform step S37, but performs the connection releasing process (S38), and then returns the process to step S22.

Figure 18:
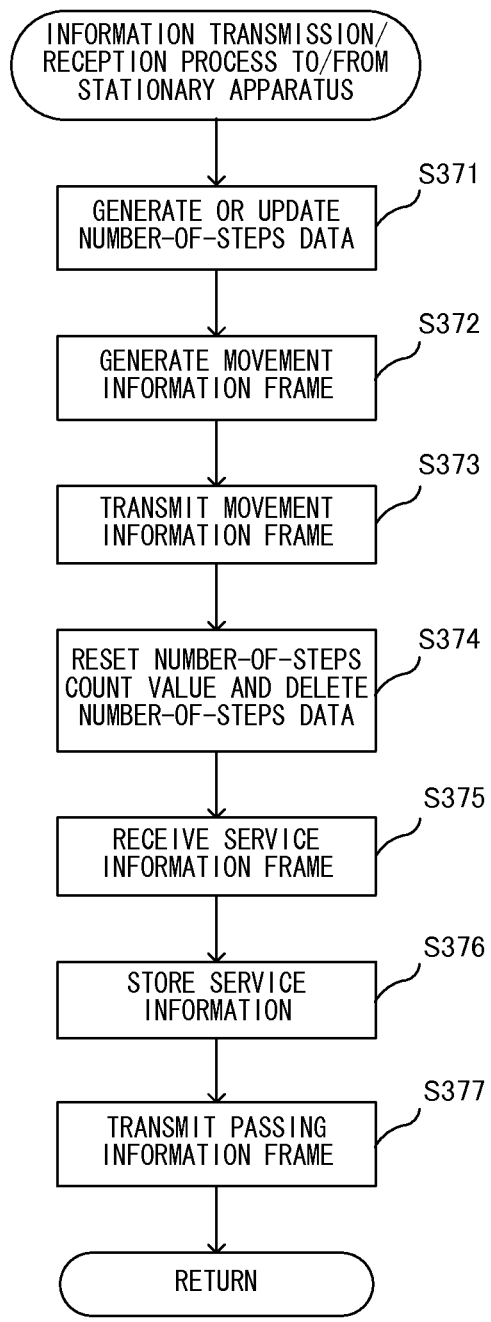
FIG. 18 is a flowchart showing a non-limiting example of a transmission and reception process.

Hereinafter, the information transmission and reception process performed in step S37 will be described with reference to FIG. 18. FIG. 18 is a flowchart showing a non-limiting example of the transmission and reception process. First, the core 231A reads a number-of-steps count value from the memory 238a of the microcomputer 238, updates the number-of-steps data D11 stored in the stored data memory 234 such that the read number-of-steps count value is added (S371). It should be noted that when no number-of-steps data D11 is stored in the stored data memory 234, the number-of-steps data D11 indicating the read number-of-steps count value is generated to be stored in the stored data memory 234.

Next, the core 231A reads the number-of-steps data D11 and access point location information D12 from the stored data memory 234. Then, the core 231A generates a movement information frame D23 (see FIG. 10A and FIG. 10D) including the number-of-steps data D11, the access point location information D12, and the current date and time (S372). Then, the core 231A transmits the movement information frame D23 to the game apparatus 103 (S373). The core 231A resets the number-of-steps count value stored in the microcomputer 238 (the memory 238a) and deletes the number-of-steps data D11 stored in the stored data memory 234 (S374). Accordingly, the value of the number-of-steps data D11 can be reset at an appropriate timing before the value of the number-of-steps data D11 becomes useless, whereby it is possible to prevent the value of the number-of-steps data D11 from increasing without limitation. Then, the core 231A receives a service information frame D25 (see FIG. 10A and FIG. 10F) from the game apparatus 103 (S375). It should be noted that the service information frame D25 is the one that was transmitted from the game apparatus 103 in step S98 shown in FIG. 14. Then, the core 231A obtains service information D6 from the received service information frame D25, and causes the service information D6 to be stored in the stored data memory 234 (S376).

Then, the core 231A reads all pieces of passing information D7 (D7a) stored in the stored data memory 234, generates a passing information frame D26 (see FIG. 10G) containing these pieces of passing information D7 (D7a), and transmits the generated passing information frame D26 to the game apparatus 103 (S377). It should be noted that the game apparatus 103 receives this passing information frame D26 in step S98 shown in FIG. 14. Then, the core 231A ends the information transmission and reception process and returns the process to the main routine (performs step S38 in FIG. 17).

(The Number-of-Steps Counting Process)

Figure 19:
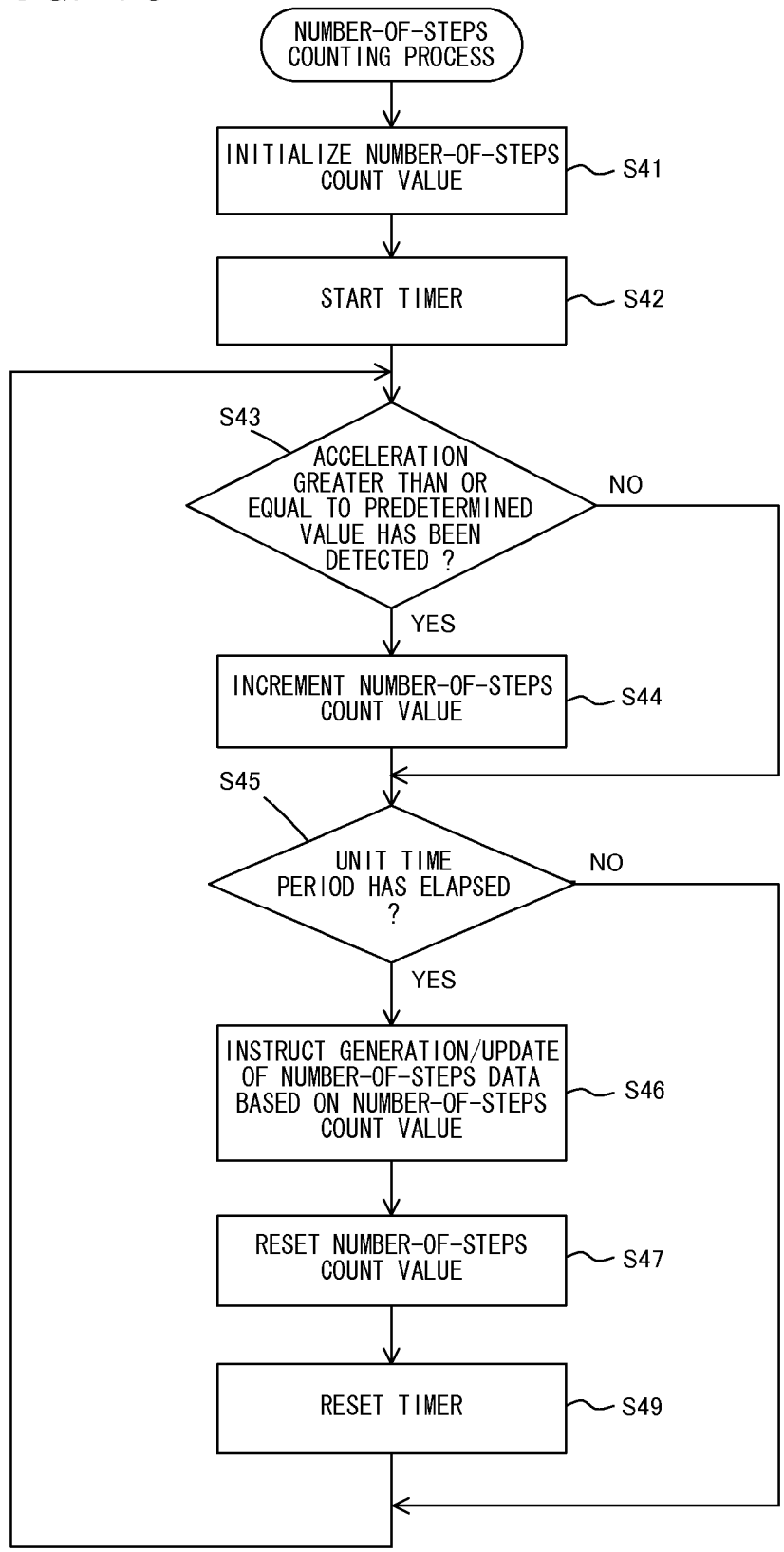
FIG. 19 is a flowchart showing a non-limiting example of a number-of-steps counting process.

Hereinafter the number-of-steps counting process performed by the microcomputer 238 will be described with reference to FIG. 19. FIG. 19 is a flowchart showing a non-limiting example of the number-of-steps counting process. The number-of-steps counting process is started upon instruction issued by the core 231A in step S21 (see FIG. 16). Although the number-of-steps counting process is performed by the microcomputer 238 in the exemplary embodiment, the number-of-steps counting process may be performed by the CPU 231. The number-of-steps counting process is performed while the power of the handheld terminal 200 is on, and the number-of-steps counting process is ended when the power of handheld terminal 200 is turned off.

First, the microcomputer 238 initializes (for example, sets to 0) the number-of-steps count value stored in the memory 238a (S41). Then, the microcomputer 238 starts the timer function of the RTC 238b (S42). Next, the microcomputer 238 determines whether an acceleration greater than or equal to a predetermined value has been detected based on a signal from the acceleration sensor 244 (S43). When it is determined that an acceleration greater than or equal to the predetermined value has been detected (YES in S43), it is considered that the number of steps has been detected, and the microcomputer 238 increments the number-of-steps count value of the memory 238a by 1 (S44). Next, the microcomputer 238 advances the process to step S45. On the other hand, when determining that an acceleration greater than or equal to the predetermined value has not been detected (NO in S43), the microcomputer 238 does not perform step S44 and advances the process to step S45.

In step S45, the microcomputer 238 determines whether a unit time period (for example, 5 minutes) has elapsed based on the count value counted by the timer. When determining that the unit time period (for example, 5 minutes) has elapsed (YES in S45), the microcomputer 238 instructs the core 231A to update (add the number-of-steps count value) the number-of-steps data D11 stored in the stored data memory 234 by use of the number-of-steps count value stored in the memory 238a (S46). When no number-of-steps data D11 is stored in the stored data memory 234, the core 231A generates number-of-steps data D11 indicating the number-of-steps count value and causes the generated number-of-steps data D11 to be stored in the stored data memory 234. Then, the core 231A resets the number-of-steps count value in the memory 238a (S47). Then, the microcomputer 238 resets the value of the timer of the RTC 238b (S48). Then, the microcomputer 238 returns the process to step S43. It should be noted that the processes from step S43 to S48 are repeated at a predetermined cycle (for example, every several seconds) until the power is turned off.

Meanwhile, when determining that the unit time period (for example, 5 minutes) has not elapsed (NO in S45), the microcomputer 238 does not perform steps S46 to S49 and returns the process to step S43.

It should be noted that, in the exemplary embodiment, the number-of-steps data D11 stored in the stored data memory 234 is deleted only when it is determined that the user of the handheld terminal 200 has returned home and the handheld terminal 200 performs step S37, and S374 (see FIG. 17 and FIG. 18). However, the configuration is not limited thereto. A configuration may be employed in which the number of steps corresponding to a certain time period (for example one week) that has elapsed since measurement of the number of steps was performed is discarded. In this case, the number-of-steps data D11 to which dates are added is stored in the stored data memory 234. That is, when the number of steps are measured for a plurality of days, the plurality of pieces of number-of-steps data D11 to each piece of which a corresponding date is added are stored. The numbers of steps indicated by all of these stored pieces of number-of-steps data D11 are added together, and the resultant value indicates the number of steps of the user. Then, number-of-steps data D11 of the date from which a certain time period has elapsed may be deleted from the stored data memory 234.

As described above, in the exemplary embodiment, while the handheld terminal 200 continues to be in a state where it is able to communicate with the game apparatus 103, the game apparatus 103 determines that the user continues to be located within the communicable range, that is, the user is at home. When the handheld terminal 200 became unable to communicate with the game apparatus 103 and then has become able to communicate with the game apparatus 103 again, it is considered that there is a possibility that the handheld terminal 200 went out of the communicable range and has returned. Therefore, the return home determination process for determining whether the user of the handheld terminal 200 went out and has returned home is performed. When it is determined in the return home determination process that the user has returned home, another user (another user being at home) is notified of the returning home. Accordingly, simply by the user walking around while carrying the handheld terminal 200, it is possible to notify another user at home that the user of the handheld terminal 200 has returned home, in a state where there is a high possibility that the user has actually returned home.

Further, according to the exemplary embodiment, in the return home determination process, it is determined that whether the user of the handheld terminal 200 has returned home, based on other return home determination factors (the number-of-steps data D11, the access point location information D12, and the elapsed time information). Accordingly, in such a case where the communication between the handheld terminal 200 and the game apparatus 103 is disconnected because of deterioration of the communication condition while the handheld terminal 200 is located in the communicable range with the game apparatus 103, it is possible to effectively prevent the game apparatus 103 from erroneously determining that the user has returned home irrespective of the fact that the user was at home, and from notifying another user the returning home.

Hereinafter, a variation of the above exemplary embodiment will be described.

(1) In the exemplary embodiment, a method conformed to the standard of IEEE 802.11b/g and a unique communication method are used for the communication between the game apparatus 103 and the handheld terminal 200 and for the communication between the handheld terminals 200. However, the communication methods are not limited thereto, and other communication methods (for example, Bluetooth (registered trademark), IrDA (Infrared Data Association) and the like may be used.

(2) Although a number-of-steps counter (the microcomputer 238 and the acceleration sensor 244) is included in the handheld terminal 200 in the exemplary embodiment, a number-of-steps measuring apparatus may be structured separately from the handheld terminal 200. In this case, a number-of-steps count value may be obtained from the number-of-steps measuring apparatus, by the handheld terminal 200 performing periodically wireless communication with the number-of-steps measuring apparatus.

(3) According to the exemplary embodiment, in the return home determination process, it is determined, the user of the handheld terminal 200 has returned home based on other return home determination factors (the number-of-steps data D11, the access point location information D12, and the elapsed time information). However, without using such other return home determination factors, it may be always determined that, when a communication-disabled handheld terminal 200 has become able to communicate again (when the game apparatus 103 has become able to receive a terminal beacon frame D21 from the handheld terminal 200 again), the user of the handheld terminal 200 has returned home, and a process for announcing (notifying) the user's returning home (corresponding to predetermined information processing according to the certain exemplary embodiments) may be performed.

(4) As described above, according to the exemplary embodiment, when the handheld terminal 200 has entered, after having gone out of the communicable range with the game apparatus 103, the communicable range again, the game apparatus 103 performs a process of announcing (notifying) the returning home of the user of the handheld terminal 200, as predetermined information processing according to the certain exemplary embodiments. However, other information processing may be performed. For example, the game apparatus 103 may perform a process or the like for causing the marker 108 to be lit and causing the light to be reflected by a wall in the house, thereby turning on the television 102, which has been turned off. Accordingly, the user can watch a television show or a game video without performing an operation for turning on the television 102 immediately after returning home. It should be noted that the game apparatus 103 may also perform the process of announcing the user's returning home in addition to the above process, thereby displaying an image for notification of the user's returning home as shown in FIG. 2 on the screen of the television 102 that is automatically turned on.

(5) The certain exemplary embodiments has been applied to the stationary game apparatus 103 and the handheld game apparatus (handheld terminal) 200. However, the certain exemplary embodiments may be applied to any other stationary information processing apparatus that does not include a function for performing game processing. For example, a general personal computer may be used as the stationary information processing apparatus according to the certain exemplary embodiments, and a mobile phone, a personal handy phone system (PHS), a personal digital assistant (PDA), or the like may be used as the handheld information processing apparatus.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a portable device and a further device, wherein the portable device comprises:
    at least one sensor;
    a processor operatively coupled to the at least one sensor, the processor configured to repeatedly generate information related to human physical activity based on signals repeatedly produced by the at least one sensor;
a memory configured to store the repeatedly generated information related to human physical activity;
a display coupled to the processor, the processor being further configured to display at least some of the generated information related to human physical activity on the display; and
a wireless transceiver operatively coupled to the processor, the wireless transceiver detecting whether wireless communication with the further device is possible and, in response to detecting that wireless communication with the further device is possible, automatically and repeatedly transmitting via wireless communication, without a user commanding the portable device to transmit, the information related to human physical activity to the further device for storage, the wireless transceiver wirelessly transmitting the stored repeatedly generated information to the further device when the portable device detects that communications with the further device can be established, and
the processor being further configured to receive one or more messages from the further device upon completing wireless transfer of the stored information related to human physical activity to the further device; and
the further device comprising:
a data storage memory; and
a further processor configured to:
receive the wirelessly transmitted information; and
store the received information related to human physical activity in the data storage memory.

2. The system of claim 1 wherein the further device is configured to transmit the information to a server.

3. The information processing system according to claim 1, wherein the transmitted information related to human physical activity represents human physical activity detections accumulated by the portable device since a previous transmission of the information related to human physical activity to the further device.

4. A portable device comprising:
at least one sensor that recurrently provides a signal;
a processor configured to recurrently determine, in response to the signal, at least one parameter indicating human physical activity;
a memory configured to store the recurrently determined at least one parameter indicating human physical activity;
a wireless transmitter operatively coupled to the processor, the wireless transmitter wirelessly transmitting, without requiring a user commanding the portable device to transmit, the at least one human physical activity indicating parameter to a further device for storage, the wireless transmitter wirelessly transmitting the stored recurrently determined at least one parameter to the further device when the portable device determines that communications with the further device can be established; and
a display operatively coupled to the processor, the processor being further configured to display the at least one human physical activity indicating parameter on the display,
wherein the processor is further configured to receive one or more messages from the further device upon completing wireless transfer of the stored at least one human physical activity indicating parameter to the further device.

5. The portable device according to claim 4, wherein the at least one sensor comprises an accelerometer.

6. The portable device according to claim 4, wherein the parameter includes location information.

7. The portable device according to claim 4, wherein the at least one sensor provides the signal while the portable device is being carried by a user and the parameter indicates human physical activity of a human carrying the portable device.

8. The portable device according to claim 4, wherein the parameter comprises step count.

9. The portable device according to claim 4, further comprising a threshold detector configured to compare the signal to a threshold, and wherein the processor is further configured to count occurrences of the signal exceeding the threshold.

10. The portable device according to claim 4, wherein the wireless transmitter automatically detects when it comes into wireless communication with the further device, and in response, automatically transmits the at least one human physical activity indicating parameter to the further device.

11. The portable device according to claim 4, wherein the wireless transmitter automatically detects when wireless communication with the further device becomes enabled, and in response, automatically transmits the at least one human physical activity indicating parameter to the further device.

12. The portable device according to claim 4, wherein the wireless transmitter transmits the at least one parameter to the further device via a short range wireless radio transmission.

13. The portable device according to claim 4, wherein the processor is further configured to determine the at least one physical activity parameter based upon the at least one sensor detecting motion of the portable device.

14. The portable device according to claim 13, wherein the processor determines whether the detected motion of the portable device corresponds to human movement.

15. The portable device of claim 4, wherein the processor determines the at least one parameter while the wireless communication is disabled and stores the parameter in the memory, and the wireless transmitter transmits the at least one parameter to the further device in response to a determination by the portable device that the wireless communication has re-enabled.

16. The portable device according to claim 4, wherein the further device is configured to operate in standby mode, and wherein the portable device is further configured to transmit to the further device for storage while the further device is operating in standby mode.

17. The portable device according to claim 4, wherein the portable device is configured for a low power mode, and the wireless transmitter is configured to communicate while the portable device is in the low power mode.

18. The portable device according to claim 4, wherein the transmitted at least one parameter includes time information related to the human physical activity.

19. The portable device according to claim 4, wherein the stored recurrently determined parameters indicating human physical activity comprises respective parameters indicating human physical activity for each of different corresponding time periods.

20. The portable device according to claim 4, wherein the processor is further configured to delete a stored human physical activity parameter upon determining that transmission is completed.

21. The portable device according to claim 4, wherein the processor is further configured to reset the recurrently determined parameter indicating human physical activity after transmitting it to the further device.

22. The portable device according to claim 4, wherein the wireless transmitter transmits human physical activity indicating parameters the portable device accumulated while the portable device was unable to wirelessly communicate with the further device.

23. The portable device of claim 4 wherein the portable device wirelessly transmits the parameter as data that is different and updated from parameter data the portable device previously transmitted.

24. An information processing system comprising a portable device and a further device, wherein the portable device comprises:

at least one sensor;

a processor operatively coupled to the at least one sensor and the memory, the processor configured to repeatedly generate information related to human physical activity based on signals repeatedly generated by the at least one sensor;

a memory configured to store repeatedly generated information related to human physical activity; and a wireless transceiver operatively coupled to the processor, the wireless transceiver detecting whether wireless communication with the further device is possible and, in response to the detecting, transmitting via wireless communication without a user commanding the portable device to transmit, the information related to human physical activity to the further device for storage, wherein the processor generates the information related to human physical activity while the wireless communication is disabled and stores the information in the memory, and the wireless transceiver transmits the stored repeatedly generated information to the further device in response to a determination by the portable device that the wireless communication has re-enabled, wherein the processor is further configured to receive one or more messages from the further device upon completing wireless transfer of the stored repeatedly generated information to the further device; and the further device comprising:
a data storage memory; and
a further processor configured to:
receive the wirelessly transmitted information; and
store the received information related to human physical activity in the data storage memory.

25. The portable device according to claim 24, further comprising a display operatively coupled to the processor, the processor being further configured to display the at least one physical activity parameter on the display.

26. A portable device comprising:

at least one sensor that recurrently provides a signal;

a processor configured to recurrently determine, in response to the signal, at least one parameter indicating human physical activity;

a memory configured to store the recurrently determined at least one parameter indicating human physical activity; and a wireless transmitter operatively coupled to the processor, the wireless transmitter wirelessly transmitting the at least one physical activity parameter to a further device without requiring a user commanding the portable device to transmit, the processor being further configured to determine the at least one parameter while the wireless communication is disabled and store the parameter in the memory, the wireless transmitter wirelessly transmitting the stored repeatedly generated at least one parameter to the further device in response to a determination by the portable device that the wireless communication has re-enabled, wherein the processor is further configured to receive one or more messages from the further device upon completing wireless transfer of the stored at least one human physical activity parameter to the further device.

27. The portable device according to claim 26, wherein the processor is further configured to delete a stored human physical activity parameter upon determining that transmission is completed.

28. The portable device according to claim 26, wherein the transmitted stored parameter represents human physical activity determinations by the processor accumulated since a previous transmission of the parameter to the further device.

* * * * *